United States Patent
Tu et al.

(10) Patent No.: US 9,219,913 B2
(45) Date of Patent: Dec. 22, 2015

(54) INFERRED BASE LAYER BLOCK FOR TEXTURE_BL MODE IN HEVC BASED SINGLE LOOP SCALABLE VIDEO CODING

(71) Applicant: QUALCOMM Incorporated, San Diego, CA (US)

(72) Inventors: Chengjie Tu, San Diego, CA (US); Xianglin Wang, San Diego, CA (US); Jianle Chen, San Diego, CA (US); Liwei Guo, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 225 days.

(21) Appl. No.: 13/914,387

(22) Filed: Jun. 10, 2013

(65) Prior Publication Data
US 2013/0336394 A1 Dec. 19, 2013

Related U.S. Application Data

(60) Provisional application No. 61/659,200, filed on Jun. 13, 2012, provisional application No. 61/707,396, filed on Sep. 28, 2012.

(51) Int. Cl.
*H04N 7/26* (2006.01)
*H04N 19/39* (2014.01)
(Continued)

(52) U.S. Cl.
CPC ......... *H04N 19/0046* (2013.01); *H04N 19/105* (2014.11); *H04N 19/187* (2014.11); *H04N 19/30* (2014.11); *H04N 19/39* (2014.11); *H04N 19/44* (2014.11)

(58) Field of Classification Search
CPC ............ H04N 19/0046; H04N 19/105; H04N 19/187; H04N 19/30; H04N 19/39; H04N 19/44
See application file for complete search history.

(56) References Cited

U.S. PATENT DOCUMENTS 6,614,936 B1 * 9/2003 Wu et al. .................. 382/238
2006/0104354 A1 * 5/2006 Han et al. ................. 375/240.03
(Continued)

OTHER PUBLICATIONS

International Search Report and Written Opinion—PCT/US2013/045225—ISA/EPO—Aug. 29, 2013.
(Continued)

*Primary Examiner* — Jay Patel
*Assistant Examiner* — Joseph Suh
(74) *Attorney, Agent, or Firm* — Knobbe, Martens, Olson & Bear, LLP

(57) ABSTRACT

An apparatus for coding video data using a single-loop decoding approach may include a memory unit and a processor in communication with the memory unit. In an example, the memory unit stores the video data, the video data including a base layer and an enhancement layer. The base layer includes a base layer block, a non-constrained INTRA mode block, and an INTER mode block. The base layer block includes a sub-block located at least partially within one of the non-constrained INTRA mode block or the INTER mode block. The enhancement layer includes an enhancement layer block located at a position in the enhancement layer corresponding to a position of the base layer block in the base layer. The processor approximates pixel values of the sub-block and determines, based at least in part on the approximated pixel values, pixel values of the enhancement layer block.

19 Claims, 14 Drawing Sheets

(51) Int. Cl.
*H04N 19/105* (2014.01)
*H04N 19/30* (2014.01)
*H04N 19/187* (2014.01)
*H04N 19/44* (2014.01)

(56) References Cited

U.S. PATENT DOCUMENTS

| | | | |
|---|---|---|---|
| 2007/0160133 A1 | 7/2007 | Bao et al. | |
| 2007/0206673 A1* | 9/2007 | Cipolli et al. | 375/240.1 |
| 2010/0020867 A1 | 1/2010 | Wiegand et al. | |
| 2010/0208810 A1 | 8/2010 | Yin et al. | |
| 2010/0232520 A1* | 9/2010 | Wu et al. | 375/240.26 |
| 2010/0260260 A1 | 10/2010 | Wiegand et al. | |
| 2010/0272185 A1 | 10/2010 | Gao et al. | |
| 2011/0012994 A1* | 1/2011 | Park et al. | 348/43 |
| 2012/0314767 A1* | 12/2012 | Wang et al. | 375/240.12 |

OTHER PUBLICATIONS

Xiong, R., et al., "A New Method for Inter-Layer Prediction in Spatial Scalable Video Coding", 20. JVT Meeting; 77. MPEG Meeting; Jul. 15, 2006 Jul. 21, 2006; Klagenfurt, AT; (Joint Video Team of ISO/IEC JTC1/SC29/WG11 and ITU-TSG.16), No. JVT-T081, Jul. 15, 2006, XP030006568, ISSN: 0000-0408; pp. 1-11.

Liu Y., et al., "Improved Intra Prediction for H.264/AVC Scalable Extension", Multimedia Signal Processing, 2007. MMSP 2007. IEEE 9th Workshop on, IEEE, Piscataway, NJ, USA, Oct. 1, 2007, pp. 247-250, XP031224823, ISBN: 978-1-4244-1274-7.

Schwarz H. et al.: "Constrained Inter-Layer Prediction for Single-Loop Decoding in Spatial Scalability" Image Processing 2005. ICIP 2005. IEEE International Conference on Genova, Italy Sep. 11-14, 2005, Piscataway, NJ, USA, IEEE, vol. 2, pp. 870-873, X.

Segall C.A., et al., "Spatial Scalability Within the H.264/AVC Scalable Video Coding Extension", IEEE Transactions on Circuits and Systems for Video Technology, IEEE Service Center, Piscataway, NJ, US, vol. 17, No. 9, Sep. 1, 2007, pp. 1121-1135, XP011193020, ISSN: 1051-8215, DOI: 10.1109/TCSVT.2007.906824.

Xiong R., et al., "In-Scale Motion Compensation for Spatially Scalable Video Coding," IEEE Transactions on Circuits and Systems for Video Technology, vol. 18 (2), Feb. 2008, pp. 145-158.

* cited by examiner

INFERRED BASE LAYER BLOCK FOR TEXTURE_BL MODE IN HEVC BASED SINGLE LOOP SCALABLE VIDEO CODING

CROSS-REFERENCE TO RELATED APPLICATIONS

This application claims priority to U.S. Provisional Patent Application No. 61/659,200, entitled "INFERRED BASE LAYER BLOCK FOR TEXTURE_BL MODE IN HEVC BASED SINGLE LOOP SCALABLE VIDEO CODING" and filed on Jun. 13, 2012, and to U.S. Provisional Patent Application No. 61/707,396, entitled "INFERRED BASE LAYER BLOCK FOR TEXTURE_BL MODE IN HEVC BASED SINGLE LOOP SCALABLE VIDEO CODING" and filed on Sep. 28, 2012, the entire contents of which are incorporated by reference.

TECHNICAL FIELD

This disclosure relates to video coding and compression and, in particular, to scalable video coding (SVC).

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video compression techniques perform spatial (intra-picture) prediction and/or temporal (inter-picture) prediction to reduce or remove redundancy inherent in video sequences. For block-based video coding, a video slice (e.g., a video frame, a portion of a video frame, etc.) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

Some block-based video coding and compression makes use of scalable techniques. Scalable video coding (SVC) refers to video coding in which a base layer and one or more scalable enhancement layers are used. For SVC, a base layer typically carries video data with a base level of quality. One or more enhancement layers carry additional video data to support higher spatial, temporal and/or SNR levels. In some cases, the base layer may be transmitted in a manner that is more reliable than the transmission of enhancement layers.

SUMMARY

In general, this disclosure describes techniques related to scalable video coding (SVC). One aspect of the disclosure provides an apparatus configured to code video data using a single-loop decoding approach. The apparatus comprises a memory unit configured to store video data. The video data may comprise a base layer and an enhancement layer. The base layer may comprise a base layer block, a first block, and a second block. The first block may be predicted based on neighboring pixels that are reconstructed based on an already coded frame. The second block may be predicted based on a block in an already coded frame. The base layer block may comprise a sub-block that is located at least partially within one of the first block or the second block. The enhancement layer may comprise an enhancement layer block. The enhancement layer block may be located at a position in the enhancement layer corresponding to a position of the base layer block in the base layer. The apparatus further comprises a processor in communication with the memory unit. The processor may be configured to approximate pixel values of the sub-block. The processor may be further configured to determine, based at least in part on the approximated pixel values of the sub-block, pixel values of the enhancement layer block.

Another aspect of the disclosure provides a method for decoding video data using a single-loop decoding approach. The method comprises receiving syntax elements extracted from an encoded video bitstream. The method further comprises approximating pixel values of a sub-block of a base layer block of a base layer of the video data based on the syntax elements. The base layer may comprise a first block and a second block. The first block may be predicted based on neighboring pixels that are reconstructed based on an already decoded frame. The second block may be predicted based on a block in an already decoded frame. The sub-block may be located at least partially within one of the first block or the second block. The method further comprises determining, based at least in part on the approximated pixel values of the sub-block of the base layer block, pixel values of an enhancement layer block of an enhancement layer of the video data. The enhancement layer block may be located at a position in the enhancement layer corresponding to a position of the base layer block in the base layer.

Another aspect of the disclosure provides a method for encoding video data using a single-loop decoding approach. The method comprises approximating pixel values of a sub-block of a base layer block of a base layer of the video data based on the syntax elements. The base layer may comprise a first block and a second block. The first block may be predicted based on neighboring pixels that are reconstructed based on an already encoded frame. The second block may be predicted based on a block in an already encoded frame. The sub-block may be located at least partially within one of the first block or the second block. The method further comprises determining, based at least in part on the approximated pixel values of the sub-block of the base layer block, pixel values of an enhancement layer block of an enhancement layer of the video data. The enhancement layer block may be located at a position in the enhancement layer corresponding to a position of the base layer block in the base layer. The method further comprises determining a residual value based on the determined pixel values of the enhancement layer block.

Another aspect of the disclosure provides a non-transitory computer readable medium comprising code that, when executed, causes an apparatus to approximate pixel values of a sub-block of a base layer block of a base layer of video data. The base layer may comprise a first block and a second block. The first block may be predicted based on neighboring pixels that are reconstructed based on an already coded frame. The second block may be predicted based on a block in an already coded frame. The sub-block may be located at least partially within one of the first block or the second block. The medium further comprises code that, when executed, causes an apparatus to determine, based at least in part on the approximated pixel values of the sub-block of the base layer block, pixel values of an enhancement layer block of an enhancement layer of the video data. The enhancement layer block may be located at a position in the enhancement layer corresponding to a position of the base layer block in the base layer.

Another aspect of the disclosure provides a video coding device that uses a single-loop decoding approach to decode video data. The video coding device comprises means for approximating pixel values of a sub-block of a base layer block of a base layer of the video data. The base layer may comprise a first block and a second block. The first block may be predicted based on neighboring pixels that are reconstructed based on an already coded frame. The second block may be predicted based on a block in an already coded frame. The sub-block may be located at least partially within one of the first block or the second block. The video coding device further comprises means for determining, based at least in part on the approximated pixel values of the sub-block of the base layer block, pixel values of an enhancement layer block of an enhancement layer of the video data. The enhancement layer block may be located at a position in the enhancement layer corresponding to a position of the base layer block in the base layer.

The details of one or more examples are set forth in the accompanying drawings and the description below. Other features, objects, and advantages will be apparent from the description and drawings, and from the claims.

DETAILED DESCRIPTION

Figure 1:
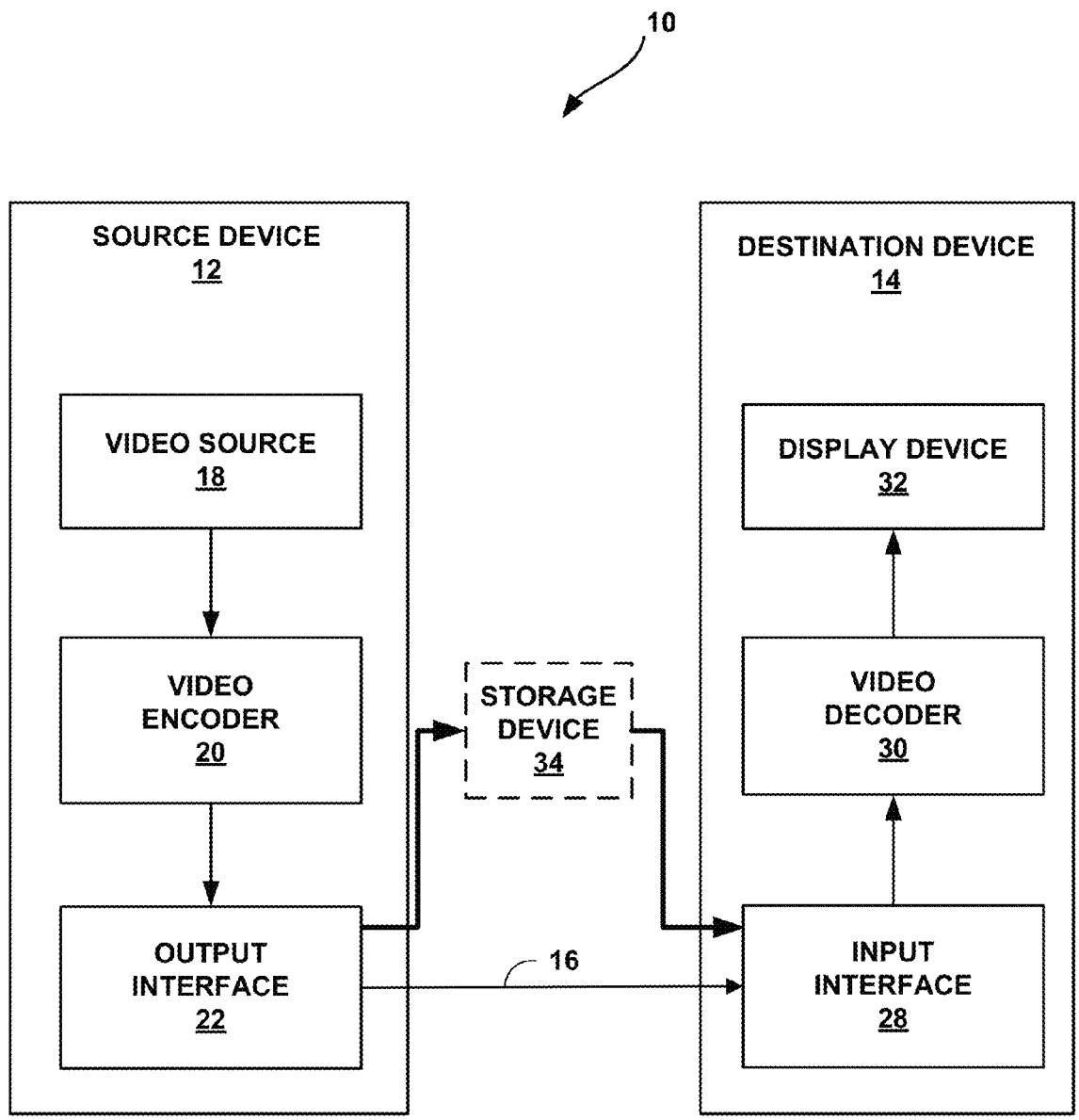
FIG. 1 is a block diagram illustrating an example video encoding and decoding system that may utilize techniques in accordance with aspects described in this disclosure.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

The techniques described in this disclosure generally relate to scalable video coding (SVC) and 3D video coding. For example, the techniques may be related to, and used with or within, a High Efficiency Video Coding (HEVC) scalable video coding (SVC) extension. In an SVC extension, there could be multiple layers of video information. The layer at the very bottom level may serve as a base layer (BL), and the layer at the very top may serve as an enhanced layer (EL). The "enhanced layer" is sometimes referred to as an "enhancement layer," and these terms may be used interchangeably. All layers in the middle may serve as either or both ELs or BLs. For example, a layer in the middle may be an EL for the layers below it, such as the base layer or any intervening enhancement layers, and at the same time serve as a BL for the enhancement layers above it.

One technique used in SVC and 3D video coding is called multi-loop decoding. In multi-loop decoding, the BL is fully reconstructed. Because the BL is fully reconstructed, a prediction mode called TEXTURE_BL mode is possible for every EL block. In TEXTURE_BL mode, a current block in the EL is predicted from a reconstructed co-located block (e.g., a base layer (sometimes referred to as a reference layer) block that is located at a position in the BL that corresponds to a position of the current block in the EL) of its BL. However, there may be a high complexity cost to buffer BL reference frames and to do full BL reconstruction.

Another technique used in SVC and 3D video coding is called single-loop decoding. Single-loop decoding may be preferred over multi-loop decoding because of the simplicity benefit of there being no need to buffer BL reference frames and no need to do BL motion compensation. However, in single-loop decoding, BL INTER and some BL INTRA blocks cannot be reconstructed due to the absence of motion compensation. As used herein, BL INTRA blocks that can be fully reconstructed are called constrained INTRA blocks and BL INTRA blocks that cannot be reconstructed are called non-constrained INTRA blocks. Consequently, TEX- TURE_BL mode may not be an option for an EL block if its co-located BL block spans any such INTER or non-constrained INTRA block. This may be the case for most blocks of P or B slices. In addition, constrained INTRA blocks may be less efficient and occur less frequently, which can reduce the BL coding efficiency.

In SVC, there is an EL-specific macroblock type called Mb_Inferred, which may help improve the coding efficiency. For an Mb_Inferred macroblock, if the macroblock's co-located BL block can be reconstructed in a single loop decoding scenario (e.g., a constrained INTRA block), the reconstructed pixels at the BL can be used to predict the macroblock at the EL. This is a special case of TEXTURE_BL mode since the TEXTURE_BL mode is enabled only when the co-located BL block is an INTRA block. As a result, this mode is referred to as INTRA_BL mode.

If the co-located BL block of a Mb_Inferred macroblock at the EL is an INTER block, the macroblock's prediction partitioning information and motion data may be used by the macroblock at the EL to perform motion compensation. The Mb_Inferred mode may be an efficient mode since there is no need to signal additional partitioning or prediction information for the block at the EL. The Mb_Inferred mode may also be a technique used to take advantage of inter-layer correlation in improving coding efficiency.

However, in some situations, the Mb_Inferred mode can reduce the coding efficiency. For example, the Mb_Inferred mode may not be used if the co-located BL block spans a non-constrained INTRA block. As mentioned above, constrained INTRA blocks are less efficient and may occur less frequently, which reduces the BL coding efficiency. Furthermore, residual prediction may not be used if the co-located BL block is an INTRA block. Finally, if the co-located BL block spans multiple macroblocks (e.g., an INTRA block and an INTER block), residual prediction is either on or off for the whole macroblock.

Figure 2:
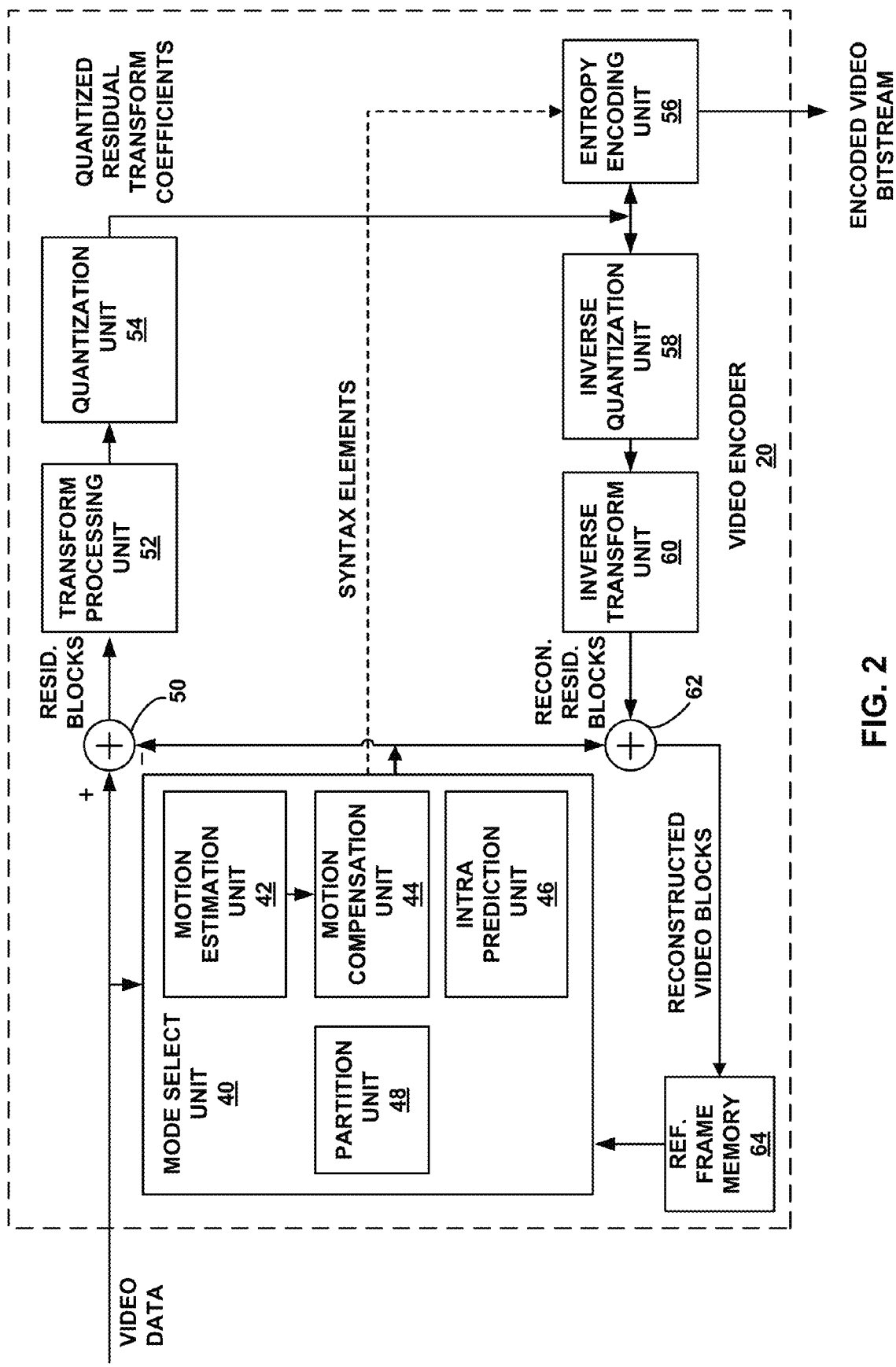
FIG. 2 is a block diagram illustrating an example of a video encoder that may implement techniques in accordance with aspects described in this disclosure.
Figure 3:
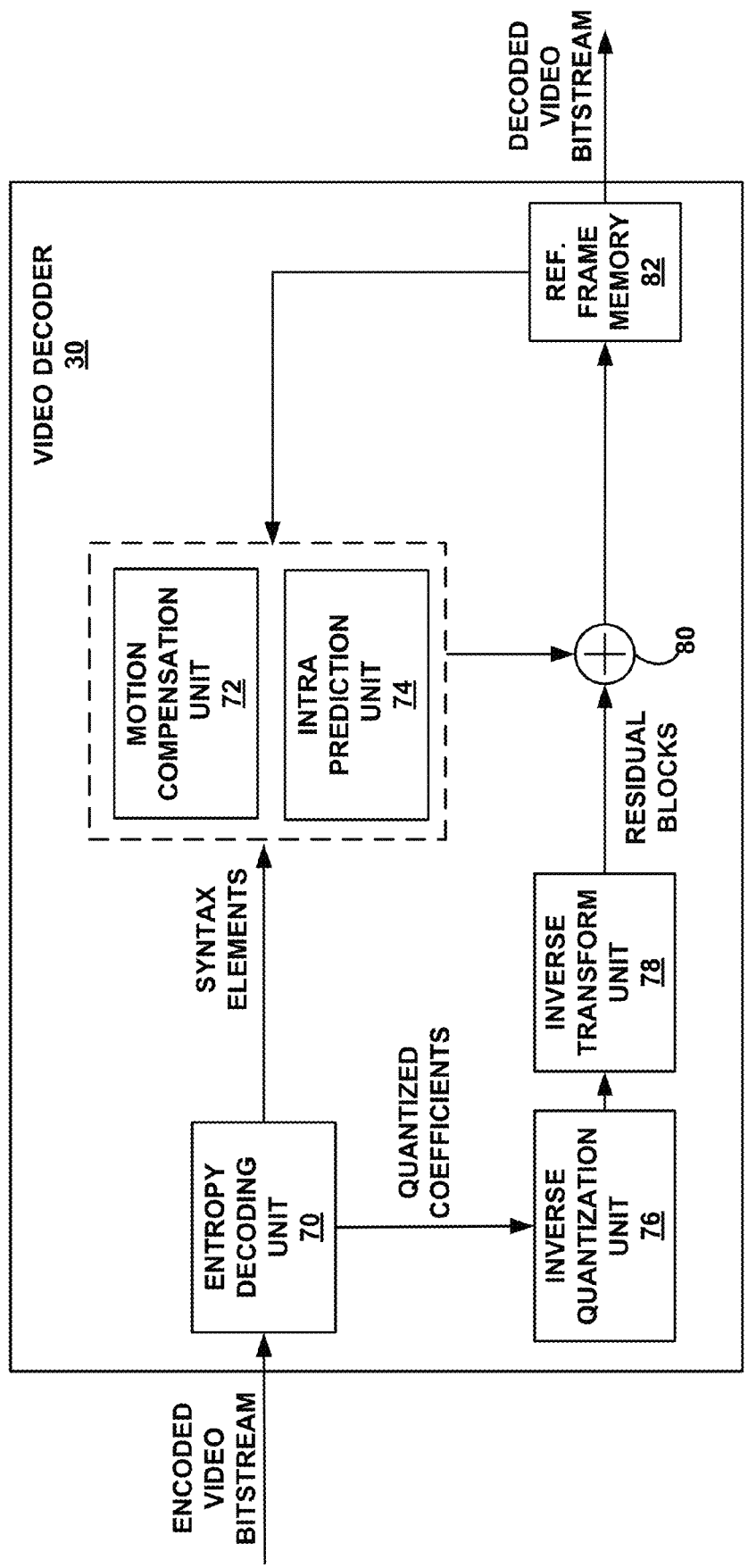
FIG. 3 is a block diagram illustrating an example of a video decoder that may implement techniques in accordance with aspects described in this disclosure.

Accordingly, the techniques of this disclosure may extend SVC's Mb_Inferred mode to HEVC-based SVC in the case of single loop decoding and may address or minimize the effects of the problems mentioned above. In particular, the techniques described herein may allow a video encoder and/or decoder to generate an inferred BL block that may span at least a portion of several blocks. As described in greater detail below, the video encoder and/or decoder may be able to reconstruct the blocks in the BL that are located within the inferred BL block, regardless of whether the blocks are constrained INTRA blocks, non-constrained INTRA blocks, or INTER blocks. In this way, the BL coding efficiency may be improved. FIGS. 1-3 describe exemplary video encoders and/or decoders that may perform the techniques described herein to extend SVC's Mb_Inferred mode to HEVC-based SVC in the case of single loop decoding.

For purposes of illustration only, the techniques described in the disclosure are described with examples including only two layers (e.g., lower level layer such as the base layer, and a higher level layer such as the enhanced layer, etc.). It should be understood that the examples described in this disclosure can be extended to examples with multiple base layers and enhancement layers as well.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. In addition, a new video coding standard, namely High Efficiency Video Coding (HEVC), is being developed by the Joint Collaboration Team on Video Coding (JCT-VC) of ITU-T Video Coding Experts Group (VCEG) and ISO/IEC Motion Picture Experts Group (MPEG). A recent draft of HEVC is available as of Jun. 7, 2012. Another recent draft of the HEVC standard is referred to as "HEVC Working Draft 7". The full citation for the HEVC Working Draft 7 is document HCTVC-I1003, Bross et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11, 9th Meeting: Geneva, Switzerland, Apr. 27, 2012 to May 7, 2012. Each of these references is incorporated by reference in its entirety.

Scalable video coding (SVC) may be used to provide quality (also referred to as signal-to-noise (SNR)) scalability, spatial scalability and/or temporal scalability. An enhanced layer may have different spatial resolution than base layer. For example, the spatial aspect ratio between EL and BL can be 1.0, 1.5, 2.0 or other different ratios. In other words, the spatial aspect of the EL may equal 1.0, 1.5, or 2.0 times the spatial aspect of the BL. In some examples, the scaling factor of the EL may be greater than the BL. For example, a size of pictures in the EL may be greater than a size of pictures in the BL. In this way, it may be possible, although not a limitation, that the spatial resolution of the EL is larger than the spatial resolution of the BL.

In SVC extension for H.264, prediction of a current block may be performed using the different layers that are provided for SVC. Such prediction may be referred to as inter-layer prediction. Inter-layer prediction methods may be utilized in SVC in order to reduce inter-layer redundancy. Some examples of inter-layer prediction may include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion of the base layer to predict motion in the enhancement layer. Inter-layer residual prediction uses the residue of the base layer to predict the residue of the enhancement layer.

In inter-layer residual prediction, the residue of the base layer may be used to predict the current block in the enhancement layer. The residue may be defined as the difference between the temporal prediction for a video unit and the source video unit. In residual prediction, the residue of the base layer is also considered in predicting the current block. For example, the current block may be reconstructed using the residue from the enhancement layer, the temporal prediction from the enhancement layer, and the residue from the base layer. The current block may be reconstructed according to the following equation:

$$\hat{I}_e = r_e + P_e + r_b \quad (1)$$

where $\hat{I}_e$ denotes the reconstruction of the current block, $r_e$ denotes the residue from the enhancement layer, $P_e$ denotes the temporal prediction from the enhancement layer, and $r_b$ denotes the residue prediction from the base layer.

In order to use inter-layer residual prediction for a macroblock (MB) in the enhancement layer, the co-located macroblock in the base layer should be an inter MB, and the residue of the co-located base layer macroblock may be upsampled according to the spatial resolution ratio of the enhancement layer (e.g., because the layers in SVC may have different spatial resolutions). In inter-layer residual prediction, the difference between the residue of the enhancement layer and the residue of the upsampled base layer may be coded in the bitstream. The residue of the base layer may be normalized based on the ratio between quantization steps of base and enhancement layers.

SVC extension to H.264 requires single-loop decoding for motion compensation in order to maintain low complexity for the decoder. In general, motion compensation is performed by adding the temporal prediction and the residue for the current block as follows:

$$\hat{I}=r+P \quad (2)$$

where $\hat{I}$ denotes the current frame, r denotes the residue, and P denotes the temporal prediction. In single-loop decoding, each supported layer in SVC can be decoded with a single motion compensation loop. In order to achieve this, all layers that are used to inter-layer intra predict higher layers are coded using constrained intra-prediction. In constrained intra prediction, intra mode MBs are intra-coded without referring to any samples from neighboring inter-coded MBs. On the other hand, HEVC allows multi-loop decoding for SVC, in which an SVC layer may be decoded using multiple motion compensation loops. For example, the base layer is fully decoded first, and then the enhancement layer is decoded.

Residual prediction formulated in Equation (1) may be an efficient technique in H.264 SVC extension. However, its performance can be further improved in HEVC SVC extension, especially when multi-loop decoding is used in HEVC SVC extension.

In the case of multi-loop decoding, difference domain motion compensation may be used in place of residual prediction. In SVC, an enhancement layer may be coded using pixel domain coding or difference domain coding. In pixel domain coding, the input pixels for an enhancement layer pixels may be coded, as for a non-SVC HEVC layer. On the other hand, in difference domain coding, difference values for an enhancement layer may be coded. The difference values may be the difference between the input pixels for the enhancement layer and the corresponding scaled base layer reconstructed pixels. Such difference values may be used in motion compensation for difference domain motion compensation.

For inter coding using difference domain, the current predicted block is determined based on the difference values between the corresponding predicted block samples in the enhancement layer reference picture and the corresponding predicted block samples in the scaled base layer reference picture. The difference values may be referred to as the difference predicted block. The co-located base layer reconstructed samples are added to the difference predicted block in order to obtain enhancement layer reconstructed samples.

FIG. 1 is a block diagram that illustrates an example video coding system 10 that may utilize techniques in accordance with aspects described in this disclosure. In particular, the video coding system 10 may perform the techniques described herein to extend SVC's Mb_Inferred mode to HEVC-based SVC in the case of single loop decoding. As used described herein, the term "video coder" refers generically to both video encoders and video decoders. In this disclosure, the terms "video coding" or "coding" may refer generically to video encoding and video decoding.

As shown in FIG. 1, video coding system 10 includes a source device 12 and a destination device 14. Source device 12 generates encoded video data. Destination device 14 may decode the encoded video data generated by source device 12. Source device 12 and destination device 14 may comprise a wide range of devices, including desktop computers, notebook (e.g., laptop, etc.) computers, tablet computers, set-top boxes, telephone handsets such as so-called "smart" phones, so-called "smart" pads, televisions, cameras, display devices, digital media players, video gaming consoles, in-car computers, or the like. In some examples, source device 12 and destination device 14 may be equipped for wireless communication.

Destination device 14 may receive encoded video data from source device 12 via a channel 16. Channel 16 may comprise any type of medium or device capable of moving the encoded video data from source device 12 to destination device 14. In one example, channel 16 may comprise a communication medium that enables source device 12 to transmit encoded video data directly to destination device 14 in real-time. In this example, source device 12 may modulate the encoded video data according to a communication standard, such as a wireless communication protocol, and may transmit the modulated video data to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 12 to destination device 14.

In another example, channel 16 may correspond to a storage medium that stores the encoded video data generated by source device 12. In this example, destination device 14 may access the storage medium via disk access or card access. The storage medium may include a variety of locally accessed data storage media such as Blu-ray discs, DVDs, CD-ROMs, flash memory, or other suitable digital storage media for storing encoded video data. In a further example, channel 16 may include a file server or another intermediate (optional) storage device 34 that stores the encoded video generated by source device 12. In this example, destination device 14 may access encoded video data stored at the file server or other intermediate storage device 34 via streaming or download. The file server may be a type of server capable of storing encoded video data and transmitting the encoded video data to destination device 14. Example file servers include web servers (e.g., for a website, etc.), FTP servers, network attached storage (NAS) devices, and local disk drives. Destination device 14 may access the encoded video data through any standard data connection, including an Internet connection. Example types of data connections may include wireless channels (e.g., Wi-Fi connections, etc.), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet (e.g., dynamic adaptive streaming over HTTP (DASH), etc.), encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1, source device 12 includes a video source 18, video encoder 20, and an output interface 22. In some cases, output interface 22 may include a modulator/demodulator (modem) and/or a transmitter. In source device 12, video source 18 may include a source such as a video capture device, e.g., a video camera, a video archive containing previously captured video data, a video feed interface to receive video data from a video content provider, and/or a computer graphics system for generating video data, or a combination of such sources.

Video encoder 20 may be configured to encode the captured, pre-captured, or computer-generated video data. The encoded video data may be transmitted directly to destination device 14 via output interface 22 of source device 12. The encoded video data may also be stored onto a storage medium or a file server for later access by destination device 14 for decoding and/or playback.

In the example of FIG. 1, destination device 14 includes an input interface 28, a video decoder 30, and a display device 32. In some cases, input interface 28 may include a receiver and/or a modem. Input interface 28 of destination device 14 receives encoded video data over channel 16. The encoded video data may include a variety of syntax elements generated by video encoder 20 that represent the video data. The syntax elements may describe characteristics and/or processing of blocks and other coded units, e.g., GOPs. Such syntax elements may be included with the encoded video data transmitted on a communication medium, stored on a storage medium, or stored a file server.

Display device 32 may be integrated with or may be external to destination device 14. In some examples, destination device 14 may include an integrated display device and may also be configured to interface with an external display device. In other examples, destination device 14 may be a display device. In general, display device 32 displays the decoded video data to a user. Display device 32 may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to a HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in the example of FIG. 1, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Again, FIG. 1 is merely an example and the techniques of this disclosure may apply to video coding settings (e.g., video encoding or video decoding) that do not necessarily include any data communication between the encoding and decoding devices. In other examples, data can be retrieved from a local memory, streamed over a network, or the like. An encoding device may encode and store data to memory, and/or a decoding device may retrieve and decode data from memory. In many examples, the encoding and decoding is performed by devices that do not communicate with one another, but simply encode data to memory and/or retrieve and decode data from memory.

Video encoder 20 and video decoder 30 each may be implemented as any of a variety of suitable circuitry, such as one or more microprocessors, digital signal processors (DSPs), application specific integrated circuits (ASICs), field programmable gate arrays (FPGAs), discrete logic, hardware, or any combinations thereof. When the techniques are implemented partially in software, a device may store instructions for the software in a suitable, non-transitory computer-readable storage medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular, etc.) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision, etc.), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be co-located with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up," "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks may not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization is a broad term intended to have its broadest ordinary meaning. In one embodiment, quantization refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

FIG. 2 is a block diagram illustrating an example of a video encoder that may implement techniques in accordance with aspects described in this disclosure. Video encoder 20 may be configured to perform any or all of the techniques of this disclosure. In particular, the video encoder 20 may perform the techniques described herein to extend SVC's Mb_Inferred mode to HEVC-based SVC when encoding video data using the single loop decoding approach. As one example, mode select unit 40 may be configured to perform any or all of the techniques described in this disclosure. However, aspects of this disclosure are not so limited. In some examples, the techniques described in this disclosure may be shared among the various components of video encoder 20. In some examples, in addition to or instead of, a processor (not shown) may be configured to perform any or all of the techniques described in this disclosure.

Video encoder 20 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as urn-directional prediction (P mode) or bi-prediction (B mode), may refer to any of several temporal-based coding modes.

As shown in FIG. 2, video encoder 20 receives a current video block within a video frame to be encoded. In the example of FIG. 1, video encoder 20 includes mode select unit 40, reference frame memory 64, summer 50, transform processing unit 52, quantization unit 54, and entropy encoding unitentropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization, etc.). Mode select unit 40 may further produce a quadtree data structure indicative of partitioning of an LCU into sub-CUs. As another example, partition unit 48 may initially partition a frame or slice into LCUs, and partition each of the LCUs into one or more inferred blocks (e.g., inferred base layer blocks as described herein). Intra-prediction unit 46 may perform intra-predictive coding of any constrained INTRA blocks in the inferred blocks and approximate pixels for any non-constrained INTRA blocks or INTER blocks in the inferred blocks as described herein. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict or calculate a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

In another embodiment, not shown, a filter module may receive the reconstructed video block from the summer 62. The filter module may perform a deblocking operation to reduce blocking artifacts in the video block associated with the CU. After performing the one or more deblocking operations, the filter module may store the reconstructed video block of the CU in decoded picture buffer. The motion estimation unit 42 and the motion compensation unit 44 may use a reference picture that contains the reconstructed video block to perform inter prediction on PUs of subsequent pictures. In addition, the intra prediction unit 46 may use reconstructed video blocks in the decoded picture buffer to perform intra prediction on other PUs in the same picture as the CU. Thus, after the filter module applies a deblocking filter to the samples associated with an edge, a predicted video block (e.g., an enhancement layer block) may be generated based at least in part on the samples associated with the edge. The video encoder 20 may output a bitstream that includes one or more syntax elements whose values are based at least in part on the predicted video block.

FIG. 3 is a block diagram illustrating an example of a video decoder that may implement techniques in accordance with aspects described in this disclosure. Video decoder 30 may be configured to perform any or all of the techniques of this disclosure. In particular, the video decoder 30 may perform the techniques described herein to extend SVC's Mb_Inferred mode to HEVC-based SVC in the case of single loop decoding. As one example, motion compensation unit 72 and/or intra prediction unit 74 may be configured to perform any or all of the techniques described in this disclosure. However, aspects of this disclosure are not so limited. In some examples, the techniques described in this disclosure may be shared among the various components of video decoder 30. In some examples, in addition to or instead of, a processor (not shown) may be configured to perform any or all of the techniques described in this disclosure.

In the example of FIG. 3, video decoder 30 includes an entropy decoding unit 70, motion compensation unit 72, intra prediction unit 74, inverse quantization unit 76, inverse transformation unit 78, reference frame memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70. For example, intra-prediction unit 74 may perform intra-predictive coding of any constrained INTRA blocks in an inferred block and approximate pixels for any non-constrained INTRA blocks or INTER blocks in an inferred block as described herein.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video slice is coded using inferred blocks (e.g., inferred base layer blocks as described herein), intra prediction unit 74 may generate prediction data for a video block of the current video slice based on a signaled TEXTURE_BL mode and data from previously decoded blocks of the current frame or picture. For example, the intra prediction unit 74 may perform intra-predictive coding of any constrained INTRA blocks in the inferred blocks and approximate pixels for any non-constrained INTRA blocks or INTER blocks in the inferred blocks as described herein. When the video frame is coded as an inter-coded (e.g., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 92. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, e.g., de quantizes, the quantized transform coefficients provided in the bitstream and decoded by entropy decoding unit 70. The inverse quantization process may include use of a quantization parameter QPY calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference frame memory 82 also stores decoded video for later presentation on a display device, such as display device 32 of FIG. 1.

In another embodiment, not shown, after the summer 80 reconstructs the video block of the CU, a filter module may perform a deblocking operation to reduce blocking artifacts associated with the CU. After the filter module performs a deblocking operation to reduce blocking artifacts associated with the CU, the video decoder 30 may store the video block of the CU in a decoded picture buffer. The decoded picture buffer may provide reference pictures for subsequent motion compensation, intra prediction, and presentation on a display device, such as display device 32 of FIG. 1. For instance, the video decoder 30 may perform, based on the video blocks in the decoded picture buffer, intra prediction or inter prediction operations on PUs of other CUs.

As mentioned briefly above, video encoder 20 encodes video data. The video data may comprise one or more pictures. Each of the pictures is a still image forming part of a video. In some instances, a picture may be referred to as a video "frame." When video encoder 20 encodes the video data, video encoder 20 may generate a bitstream. The bitstream may include a sequence of bits that form a coded representation of the video data. The bitstream may include coded pictures and associated data. A coded picture is a coded representation of a picture.

To generate the bitstream, video encoder 20 may perform encoding operations on each picture in the video data. When video encoder 20 performs encoding operations on the pictures, video encoder 20 may generate a series of coded pictures and associated data. The associated data may include sequence parameter sets, picture parameter sets, adaptation parameter sets, and other syntax structures. A sequence parameter set (SPS) may contain parameters applicable to zero or more sequences of pictures. A picture parameter set (PPS) may contain parameters applicable to zero or more pictures. An adaptation parameter set (APS) may contain parameters applicable to zero or more pictures. The parameters in an APS may be more likely to change than the parameters in a PPS.

To generate a coded picture, video encoder 20 may partition a picture into equally-sized video blocks. Each of the video blocks is associated with a treeblock. In some instances, a treeblock may also be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). Video encoder 20 may use quadtree partitioning to partition the video blocks of treeblocks into video blocks associated with CUs, hence the name "treeblocks."

A CU may refer to a rectangular image region that serves as a basic unit to which various coding tools are applied for video compression. To achieve better coding efficiency, a coding unit may have variable sizes depending on video content. To reduce redundancy, a CU is predicted and prediction residuals are signaled. A CU may split into smaller blocks for prediction (prediction units or PUs). According to HEVC or HM (e.g. the reference software for HEVC), a CU can have one of the two prediction modes: INTRA mode and INTER mode. A CU may also be split into smaller blocks for transform and each of these blocks is called a transform unit (TU).

In some examples, video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, video encoder 20 may perform encoding operations on each slice of the picture. When video encoder 20 performs an encoding operation on a slice, video encoder 20 may generate encoded data associated with the slice. The encoded data associated with the slice may be referred to as a "coded slice."

To generate a coded slice, video encoder 20 may perform encoding operations on each treeblock in a slice. When video encoder 20 performs an encoding operation on a treeblock, video encoder 20 may generate a coded treeblock. The coded treeblock may comprise data representing an encoded version of the treeblock.

To generate a coded treeblock, video encoder 20 may recursively perform quadtree partitioning on the video block of the treeblock to divide the video block into progressively smaller video blocks. Each of the smaller video blocks may be associated with a different CU. For example, video encoder 20 may partition the video block of a treeblock into four equally-sized sub-blocks, partition one or more of the sub-blocks into four equally-sized sub-sub-blocks, and so on. One or more syntax elements in the bitstream may indicate a maximum number of times video encoder 20 may partition the video block of a treeblock. A video block of a CU may be square in shape. The size of the video block of a CU (e.g., the size of the CU, etc.) may range from 8×8 pixels up to the size of a video block of a treeblock (e.g., the size of the treeblock, etc.) with a maximum of 64×64 pixels or greater.

When video encoder 20 encodes a non-partitioned CU, video encoder 20 may generate one or more prediction units (PUs) for the CU. A non-partitioned CU is a CU whose video block is not partitioned into video blocks for other CUs. Each of the PUs of the CU may be associated with a different video block within the video block of the CU. Video encoder 20 may generate a predicted video block for each PU of the CU. The predicted video block of a PU may be a block of samples. Video encoder 20 may use intra prediction or inter prediction to generate the predicted video block for a PU.

In other words, a coding unit (CU) may refer to a rectangular image region that serves as a basic unit to which various coding tools are applied for video compression. To reduce redundancy, a CU is predicted and prediction residuals are signaled. A CU may split into smaller blocks for prediction (prediction units or PUs). According to HEVC or HM (e.g. the reference software for HEVC, etc.), a CU can have one of the two prediction modes: INTRA mode and INTER mode.

When video encoder 20 uses intra prediction to generate the predicted video block of a PU, video encoder 20 may generate the predicted video block of the PU based on decoded samples of the picture associated with the PU. When video encoder 20 uses inter prediction to generate the predicted video block of the PU, video encoder 20 may generate the predicted video block of the PU based on decoded values of pictures other than the picture associated with the PU. If video encoder 20 uses intra prediction to generate predicted video blocks of the PUs of a CU, the CU is an intra-predicted CU.

Figure 4:
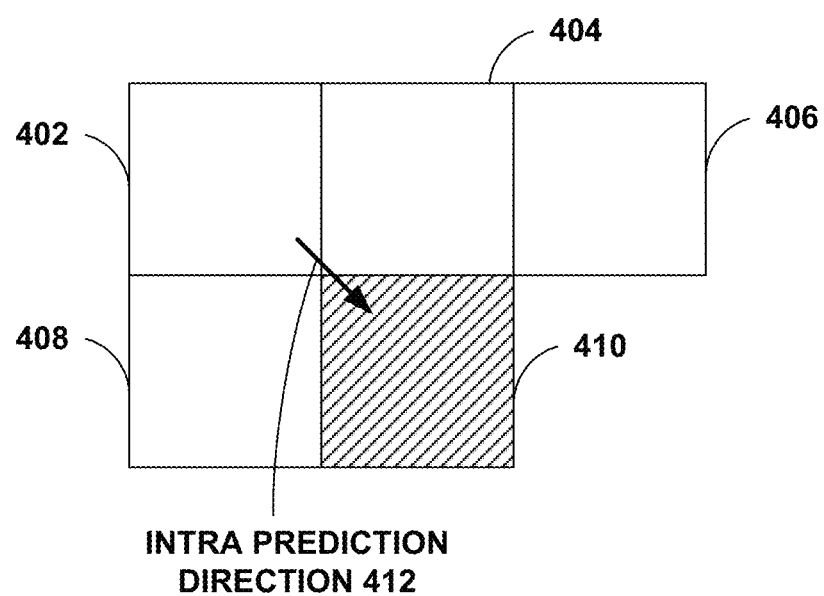
FIG. 4 is a conceptual diagram that illustrates intra mode.

A PU in an INTRA CU may be predicted spatially from already reconstructed neighboring pixels from the same frame or slice (FIG. 4). For example, CUs 402, 404, 406, and/or 408 of FIG. 4 may be predicted from already reconstructed neighboring pixels. Such pixels may be called reference pixels. Multiple intra prediction directions are allowed and the best direction may be signaled in the bitstream. For example, CU 410 may be intra predicted in the direction of arrow 412 based on any of CUs 402, 404, 406, and/or 408. Different PUs in an INTRA CU may have different prediction directions.

When video encoder 20 uses intra prediction on a PU, video encoder 20 may generate a list of candidate intra prediction modes. The list of candidate intra prediction modes may be based on the intra prediction modes of PUs that spatially or temporally neighbor the PU. In addition, as described below, the list of candidate intra prediction modes may include an intra prediction mode from a base layer. Video encoder 20 may select one of the candidates from the list and generate an index that indicates a location of the selected candidate in the list. Video encoder 20 may signal the intra prediction mode of the PU by outputting the index. In some instances, video encoder 20 may signal the intra prediction mode of the PU by outputting the index of the selected candidate and outputting a difference between the intra prediction mode of the selected candidate and the intra prediction mode of the PU.

When video encoder 20 uses inter prediction to generate a predicted video block for a PU, video encoder 20 may generate motion information for the PU. The motion information for a PU may indicate a portion of another picture that corresponds to the video block of the PU. In other words, the motion information for a PU may indicate a "reference block" or "reference sample" for the PU. Video encoder 20 may generate the predicted video block for the PU based on the portions of the other pictures that are indicated by the motion information for the PU. If video encoder 20 uses inter prediction to generate predicted video blocks for the PUs of a CU, the CU is an inter-predicted CU.

Figure 5:
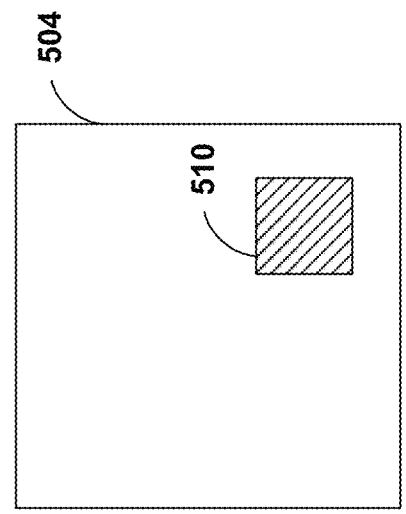
FIG. 5 is a conceptual diagram that illustrates inter mode.
Figure 5:
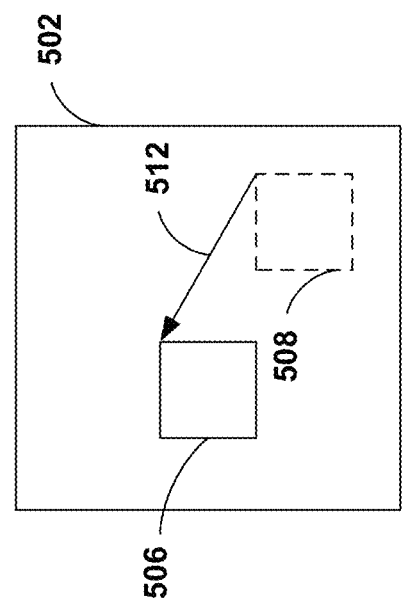

A PU in an INTER CU may be predicted temporally from best matched block or weighted blocks in already decoded previous frame or frames (in decoded order). Such blocks may be called reference blocks or reference samples. The motion information which identifies the reference block or blocks may be signaled in the bitstream. This is illustrated in FIG. 5. For example, frame 504 may include a PU 510. The PU 510 may be predicted temporally from PU 506 in frame 502, where frame 502 is a previous frame of frame 504. The PU 506 may be referred to as a reference block. PU 508 may be spatially co-located with the PU 510, and can thus be used to find the appropriate reference block (e.g., PU 506). For example, motion vector 512 points from PU 508, which is spatially co-located with the PU 510, to reference block 506 to show the displacement in distance from PU 508 to reference block 506. In this manner, a video coder, such as video encoder 20 or video decoder 30, can use the motion vector to locate a reference block in a reference frame. Different PUs in an INTER CU may have different motion information.

The emerging HEVC working draft (WD) may be considered in view of the above discussion of H.264/AVC. In the HEVC WD, there are two modes for the prediction of motion parameters. One mode may be referred to as a "merge mode," while the other mode may be referred to as an "advanced motion vector prediction" mode or "AMVP" mode.

Merge mode is a video coding mode in which motion information (such as motion vectors, reference frame indexes, prediction directions, or other information) of a neighboring video block are inherited for a current video block being coded. An index value may be used to identify the neighbor from which the current video block inherits its motion information (e.g., top, top right, left, left bottom or co-located from a temporally adjacent frame).

Another case where the motion vector of a neighboring video block is used in the coding of a current video block is so-called motion vector prediction. In this case, predictive coding of motion vectors is applied to reduce the amount of data needed to communicate the motion vector. For example, rather than encoding and communicating the motion vector itself, the encoder encodes and communicates a motion vector difference (MVD) relative to a known (or knowable) motion vector. Advanced motion vector prediction (AMVP) allows for many possible candidates for defining the MVD.

Both merge and AMVP modes build a candidate list for reference picture list zero or "RefPicList0" and a candidate list for reference picture list one or "RefPicList1." Each of these reference picture lists may be used for uni-directional or bi-directional prediction and specify a list of potential pictures or frames used for performing temporal and/or spatial motion prediction. A candidate of AMVP to be used for the coding of motion parameters are from spatial and temporal neighboring blocks. In the AMVP mode, the reference index values are signaled. In the merge mode, reference index values are not signaled since the current PU shares the reference index values of the chosen candidate motion vector predictor. In some instances, the merge mode may be implemented such that only one candidate list is created.

After video encoder 20 generates predicted video blocks for one or more PUs of a CU, video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, video encoder 20 may perform recursive quadtree partitioning on the residual data of the CU to partition the residual data of the CU into one or more blocks of residual data (e.g., residual video blocks, etc.) associated with transform units (TUs) of the CU. Each TU of a CU may be associated with a different residual video block. Video coder 20 may apply one or more transforms to a residual video block associated with a TU to generate one or more transform coefficient blocks (e.g., blocks of transform coefficients, etc.) associated with the TU. Conceptually, a transform coefficient block may be a two-dimensional (2D) matrix of transform coefficients.

After generating a transform coefficient block, video encoder 20 may perform a quantization operation on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

Video encoder 20 may associate each CU with a quantization parameter (QP) value. The QP value associated with a CU may determine how video encoder 20 quantizes transform coefficient blocks associated with the CU. Video encoder 20 may adjust the degree of quantization applied to the transform coefficient blocks associated with a CU by adjusting the QP value associated with the CU.

After video encoder 20 quantizes a transform coefficient block, video encoder 20 may scan the quantized transform coefficients to produce a one-dimensional vector of transform coefficient levels. Video encoder 20 may entropy encode the one-dimensional vector. Video encoder 20 may also entropy encode other syntax elements associated with the video data.

The bitstream generated by video encoder 20 may include a series of Network Abstraction Layer (NAL) units. Each of the NAL units may be a syntax structure containing an indication of a type of data in the NAL unit and bytes containing the data. For example, a NAL unit may contain data representing a sequence parameter set, a picture parameter set, a coded slice, supplemental enhancement information (SEI), an access unit delimiter, filler data, or another type of data. The data in a NAL unit may include entropy encoded syntax structures, such as entropy-encoded transform coefficient blocks, motion information, and so on.

Video decoder 30 may receive the bitstream generated by video encoder 20. The bitstream may include a coded representation of the video data encoded by video encoder 20. When video decoder 30 receives the bitstream, video decoder 30 may perform a parsing operation on the bitstream. When video decoder 30 performs the parsing operation, video decoder 30 may extract syntax elements from the bitstream. Video decoder 30 may reconstruct the pictures of the video data based on the syntax elements extracted from the bitstream. The process to reconstruct the video data based on the syntax elements may be generally reciprocal to the process performed by video encoder 20 to generate the syntax elements.

After video decoder 30 extracts the syntax elements associated with a CU, video decoder 30 may generate predicted video blocks for the PUs of the CU based on the syntax elements. In addition, video decoder 30 may inverse quantize transform coefficient blocks associated with TUs of the CU. Video decoder 30 may perform inverse transforms on the transform coefficient blocks to reconstruct residual video blocks associated with the TUs of the CU. After generating the predicted video blocks and reconstructing the residual video blocks, video decoder 30 may reconstruct the video block of the CU based on the predicted video blocks and the residual video blocks. In this way, video decoder 30 may determine the video blocks of CUs based on the syntax elements in the bitstream.

Figure 6:
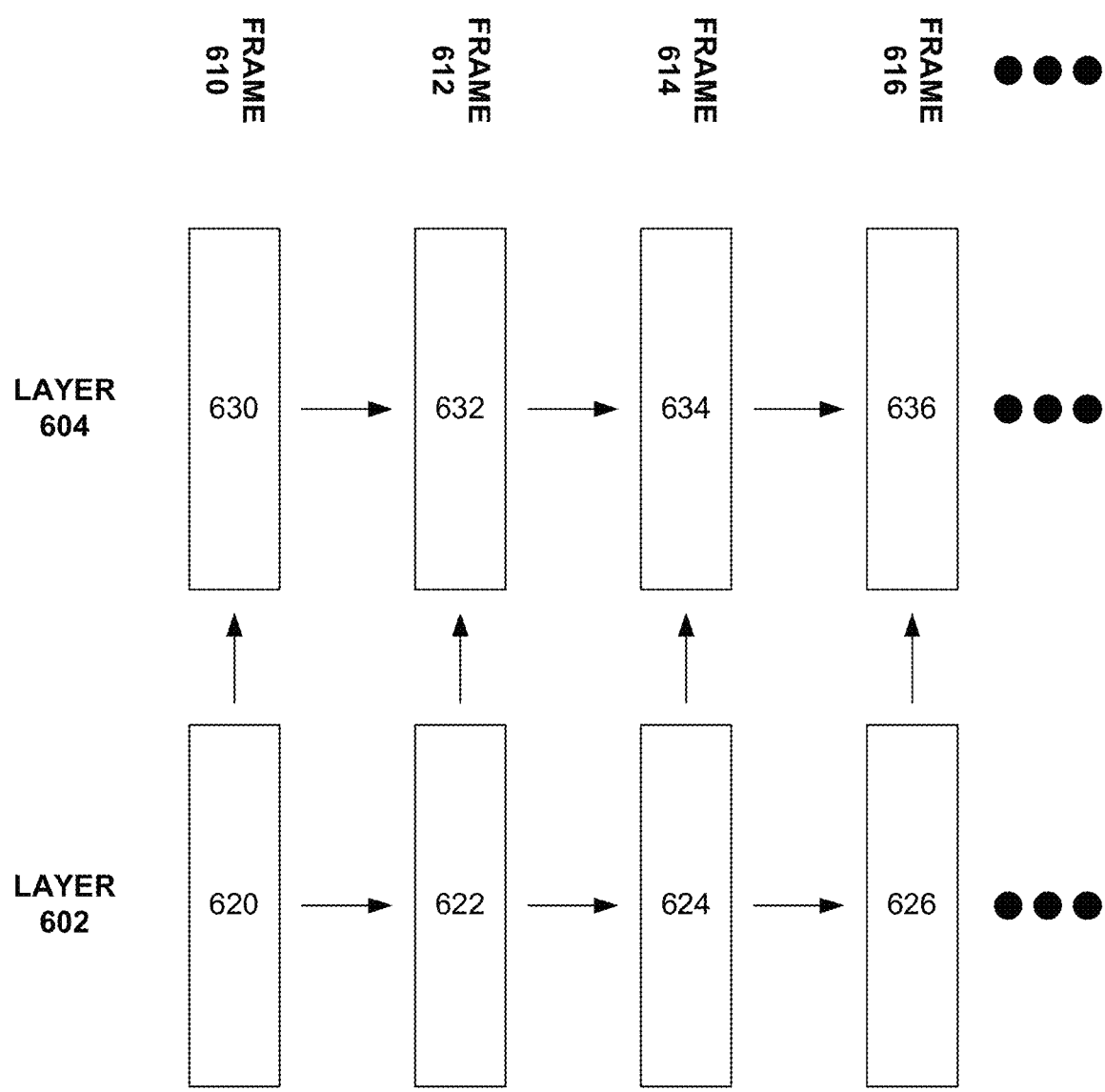
FIG. 6 is a conceptual diagram that illustrates scalable video coding.

In some instances, video encoder 20 and video decoder 30 may use scalable video coding (SVC). In SVC, there is one absolute base layer (layer 0) and one or more enhancement layers (layer 1, 2, 3 . . . ). Each enhancement layer may serve as a base layer for other layers above it. FIG. 6 shows an example setup for a 2-layer scalable video codec. For example, as illustrated in FIG. 6, layer 604 is an enhancement layer relative to layer 602, but layer 604 may also serve as a base layer for a third layer (not shown). Relative to its base layer, each enhancement layer may provide better quality and/or spatial or temporal resolution. For example, picture 630 may provide better quality and/or spatial or temporal resolution than picture 620 in frame 610, picture 632 may provide better quality and/or spatial or temporal resolution than picture 622 in frame 612, picture 634 may provide better quality and/or spatial or temporal resolution than picture 624 in frame 614, and/or picture 636 may provide better quality and/or spatial or temporal resolution than picture 626 in frame 616. Correspondingly, the scalability is called quality (or SNR) scalability, spatial scalability and temporal scalability.

Figure 7:
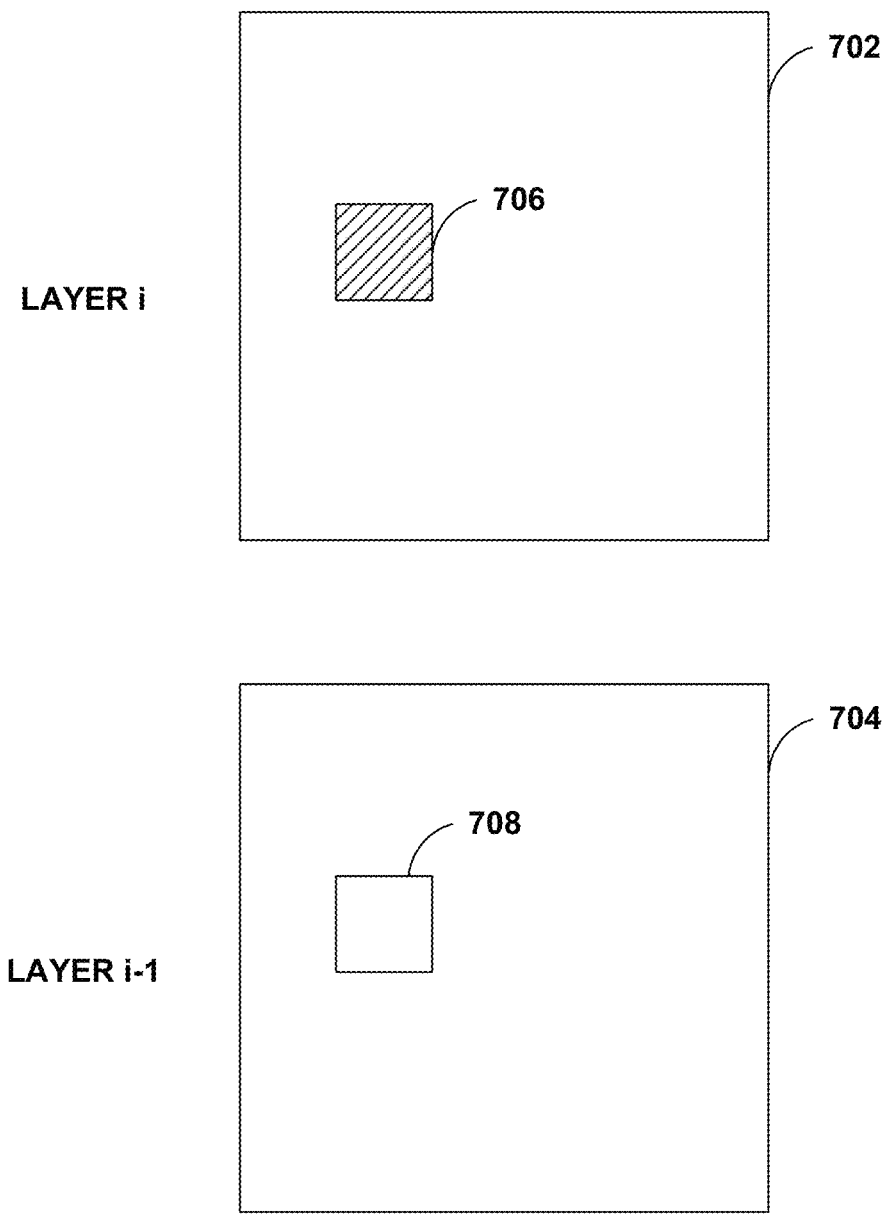
FIG. 7 is a conceptual diagram that illustrates TEXTURE_BL mode.

When video decoder 30 decodes a layer i, lower layers (0, . . . , i−1) have already been decoded and all information from lower layers may be available and used to code layer i. For example, for an enhancement layer block, besides regular INTRA and INTER mode described above, there is another prediction mode: TEXTURE_BL mode. In TEXTURE_BL mode, as also mentioned above, a block is predicted from a reconstructed co-located block of its base layer, as shown in FIG. 7. A base layer may have lower resolution than an enhancement layer. If so, the base layer reconstructed texture is up-sampled before it is used for TEXTURE_BL mode. Motion information and CU/PU partitions of the base layer block are also scaled accordingly. For example, block 704 in layer i-1 may have a lower resolution than block 702 in layer i. CU/PU 708 in block 704 may be co-located with CU/PU 706. CU/PU 708 may be up-sampled before it is used for TEXTURE-BL mode when predicting CU/PU 706. However, even with same resolution, base layer and enhancement layer CU/PU partitions may not well aligned. It is possible a CU/PU of one layer spans multiple CU/PUs of another layer.

Figure 8:
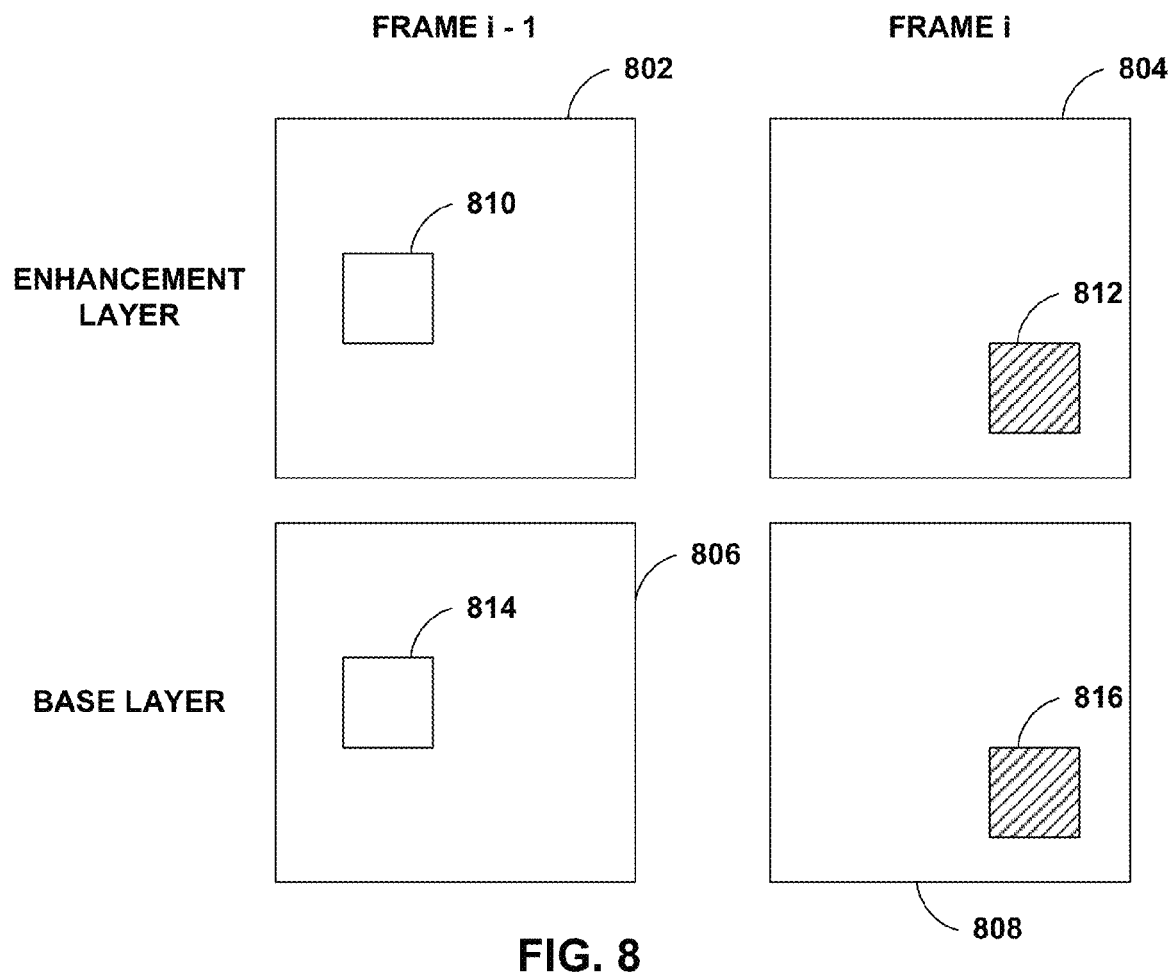
FIG. 8 is a conceptual diagram that illustrates motion compensation in multi-loop decoding.
Figure 9:
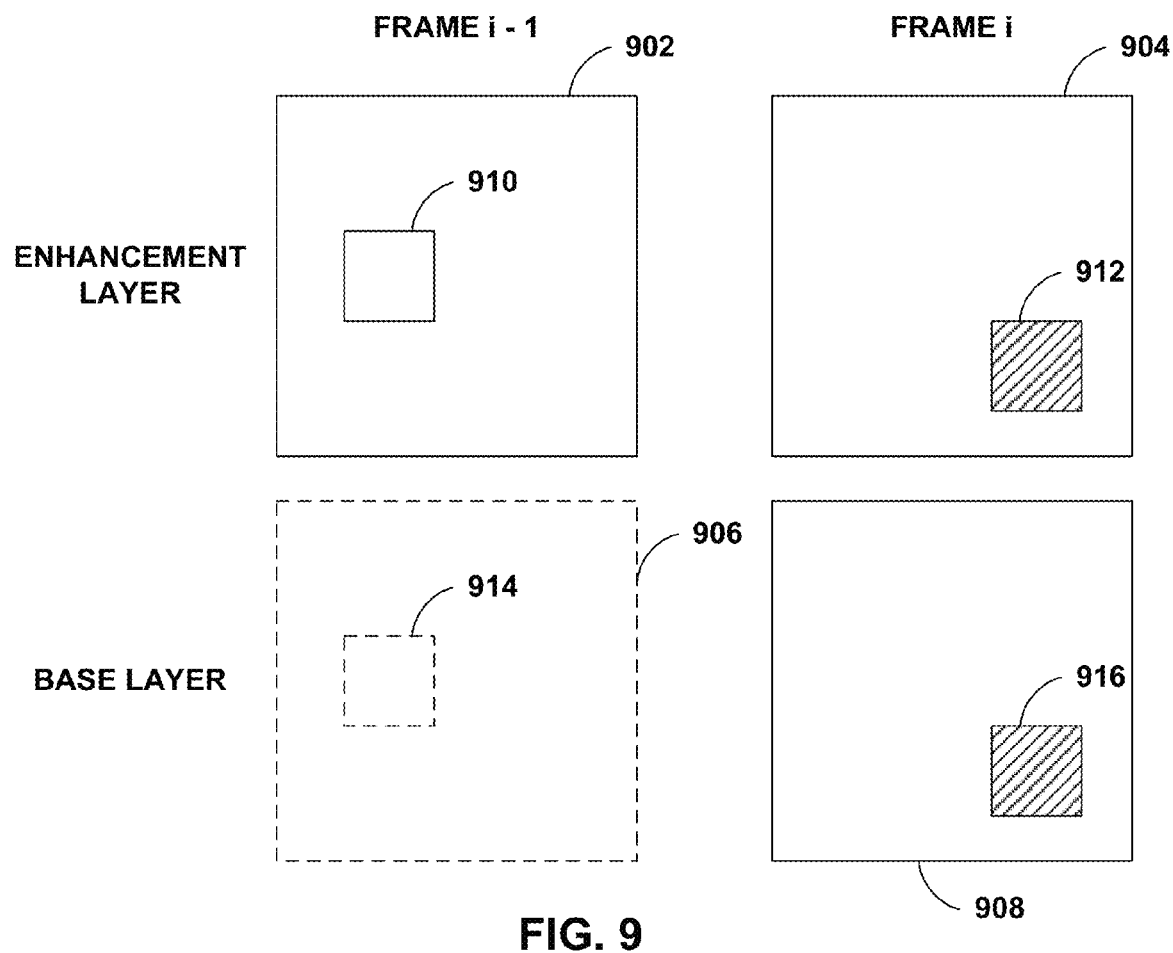
FIG. 9 is a conceptual diagram that illustrates motion compensation in single loop decoding.

As mentioned above, there are two different scalable video coding approaches: the multi-loop decoding approach and the single-loop decoding approach. To decode an enhancement layer, motion compensation happens in both base and enhancement layers in multi-loop decoding (FIG. 8) while motion compensation only happens in enhancement layer in single-loop decoding (FIG. 9). For example, as illustrated in FIG. 8, motion compensation information from CU/PU 810 in block 802 is used to decode CU/PU 812 in block 804, where both blocks 802 and 804 are in the enhancement layer. Likewise, motion compensation information from CU/PU 814 in block 806 is used to decode CU/PU 816 in block 808, where both blocks 806 and 808 are in the base layer. As another example, as illustrated in FIG. 9, motion compensation information from CU/PU 910 in block 902 is used to decode CU/PU 912 in block 904, where both blocks 902 and 904 are in the enhancement layer. However, motion compensation information from CU/PU 914 in block 906 is not used to decode CU/PU 916 in block 908, where both blocks 906 and 908 are in the base layer.

In multi-loop decoding, the base layer is fully reconstructed and so TEXTURE_BL mode is possible for every enhancement layer block. However, there may be a high complexity cost to buffer base layer reference frames and to do full base layer reconstruction. In single-loop decoding base layer INTER (and possibly even INTRA, as explained below) blocks cannot be reconstructed due to the absence of motion compensation. Consequently, TEXTURE_BL mode is not an option for an enhancement layer block if its co-located base layer block spans any such INTER or possibly INTRA block. This may be the case for most blocks of P or B slices. This may reduce coding efficiency. With proper coding tools such as residual prediction, it has been shown that the coding efficiency gap between single-loop decoding and multi-loop decoding is not huge. Single-loop decoding is usually preferred because of the simplicity benefit of there being no need to buffer base layer reference frames and no need to do base layer motion compensation.

Figure 10:
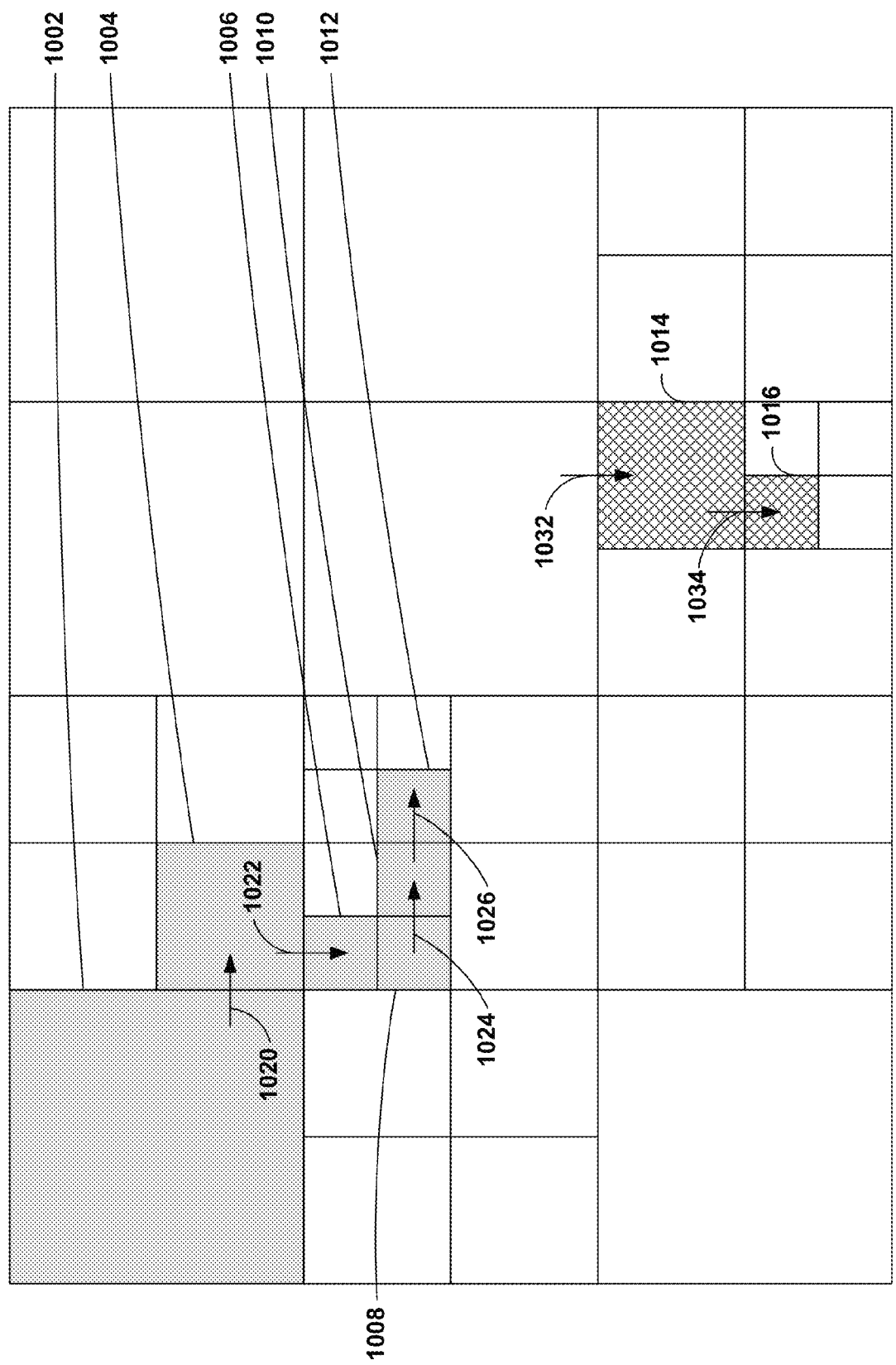
FIG. 10 is a conceptual diagram that illustrates example constrained intra blocks.

FIG. 10 is a conceptual diagram that illustrates example constrained intra blocks. In FIG. 10, the gray blocks 1002, 1004, 1006, 1008, 1010, and 1012 represent constrained INTRA blocks, the crosshatched blocks 1014 and 1016 represent non-constrained INTRA blocks, and the white blocks (e.g., the remaining blocks) represent INTER blocks.

As described above, in single loop decoding, a base layer INTRA block which can be fully reconstructed is called a constrained INTRA block (FIG. 10). A constrained INTRA block cannot use any INTER block or non-constrained INTRA block in forming its predictor. For example, arrow 1020 indicates that block 1004 can be reconstructed from block 1002, arrow 1022 indicates that block 1006 can be reconstructed from block 1004, arrow 1024 indicates that block 1010 can be reconstructed from block 1008, and/or arrow 1026 indicates that block 1012 can be reconstructed from block 1010. In the following description, a block X referring to another block Y means that block X uses reconstructed pixels from block Y in forming a predictor for block X. In the example of FIG. 10, both block 1014 and block 1016 are non-constrained INTRA blocks (block 1014 refers to an INTER block as illustrated by arrow 1032 and block 1016 refers to block 1014 as illustrated by arrow 1034).

In the H.264 based scalable video coding standard SVC, there is an enhancement layer specific macroblock type, Mb_Inferred. If an Mb_Inferred macroblock's co-located base layer block can be reconstructed in a single loop decoding scenario (e.g., a constrained intra block, etc.), the Mb_Inferred macroblock's reconstructed pixels of the base layer block can be used to predict the macroblock at the enhancement layer. This is a special case of TEXTURE_BL mode since it is enabled only when the co-located base layer block is an INTRA block. As a result, this mode in H.264/SVC is also referred to as INTRA_BL mode. If the co-located base layer block of an Mb_Inferred macroblock at an enhancement layer is an INTER block, the Mb_Inferred macroblock's prediction partitioning information and motion data are used by the Mb_Inferred macroblock at the enhancement layer to do motion compensation. Mb_Inferred mode is an efficient mode because there may be no need to signal additional partitioning/prediction information for the block at enhancement layer. Mb_Inferred mode is a key tool to take advantage of inter-layer correlation in improving coding efficiency.

SVC Mb_Inferred mode has several problems as described above. First, SVC Mb_Inferred mode may not be used if the co-located base layer block spans a non-constrained INTRA block. SVC base layer can be coded in constrained intra prediction mode (e.g., when all INTRA blocks are constrained). Because constrained INTRA blocks are less efficient and happen less frequently, this could reduce base layer coding efficiency. Second, residual prediction may not be used if the co-located base layer block is an INTRA block. Third, if the co-located base block spans multiple macroblocks, residual prediction is either used or not used on the whole macroblock.

The techniques of this disclosure may extend SVC's Mb_Inferred mode to HEVC-based scalable video coding in case of single loop decoding and may address the problems mentioned above. In an embodiment, the co-located base layer block of the current enhancement layer PU is referred to as $O_b$. In single loop decoding, because only constrained INTRA blocks can be reconstructed, part of or all pixels of $O_1$, may not be reconstructed. In this case, those pixels may be approximated. The reconstructed/approximated co-located base block is called an inferred base layer block.

Figure 11:
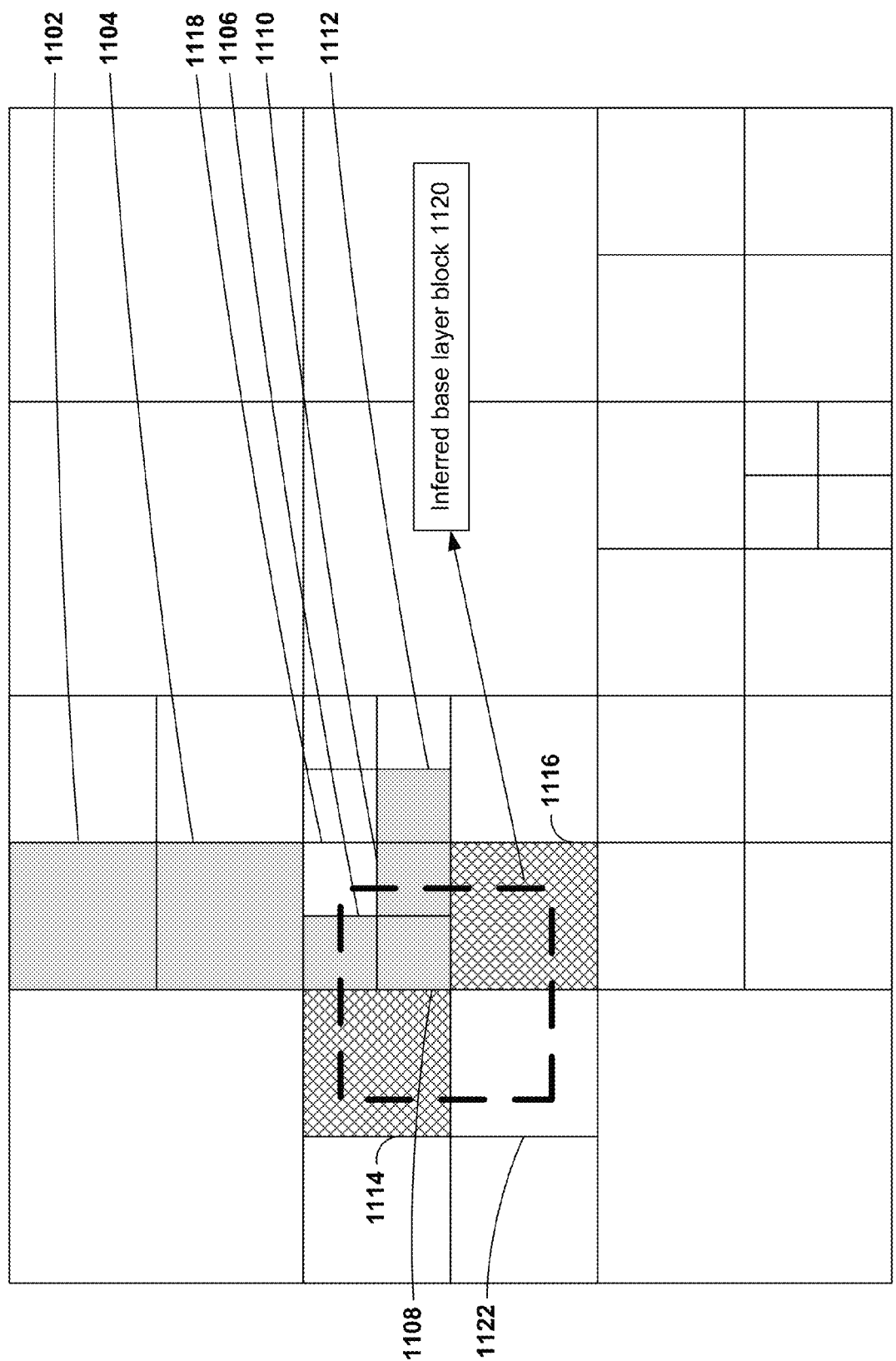
FIG. 11 is a conceptual diagram that illustrates an example inferred base layer block.

FIG. 11 is a conceptual diagram that illustrates an example inferred base layer block 1120. In FIG. 11, the gray blocks 1102, 1104, 1106, 1108, 1110, and 1112 may represent constrained INTRA blocks, the crosshatched blocks 1114 and 1116 may represent non-constrained INTRA blocks, and the white blocks (e.g., the remaining blocks) may represent INTER blocks. A sample inferred base layer block 1120 is shown in FIG. 11 as a thick dashed rectangle. The sample inferred base layer block 1120 spans seven base layer PUs. Those pixels in the three constrained INTRA PUs 1106, 1108, and 1110 may be reconstructed and pixels in one INTER PU and two non-constrained INTRA PUs 1114 and 1116 may have to be approximated. With the inferred base layer block 1120, TEXTURE_BL mode may be enabled everywhere.

As shown in the example of FIG. 11, an inferred base layer block 1120 may span multiple base layer PUs and the inferred base layer block 1120 may be partitioned into multiple sub-blocks by PU boundaries (seven sub-blocks 1106, 1108, 1110, 1114, 1116, 1118, and 1122 for the inferred base layer block 1120 in FIG. 11). The partition unit 48 of the video encoder 20 and/or the intra-prediction unit 74 of the video decoder 30 may partition the inferred base layer block 1120 in such a manner.

In some embodiments, in multi-loop decoding mode or if a sub-block is part of a constrained INTRA PU, the sub-block can be fully reconstructed. However, if not in the multi-loop decoding mode and if a sub-block is in a non-constrained INTRA PU (INTRA sub-block) or an INTER CU (INTER sub-block), the sub-block may not be reconstructed because required reference pixels/frames may not be available. Below is a proposed technique to approximate the reconstruction of such a sub-block. The intra-prediction unit 46 of the video encoder 20 and/or the intra-prediction unit 74 of the video decoder 30 may perform the techniques described below to approximate the reconstruction of such a sub-block.

In multi-loop decoding, sub-block $S_b$ may be reconstructed as $$S_b = R_b + E_b \quad (3)$$

where $E_b$ is a prediction residual and $R_b$ is the reference block (or predictor) derived from INTRA mode reference pixels (e.g., if $S_b$ is INTRA) or derived from INTER mode reference blocks via motion compensation (e.g., if $S_b$ is INTER).

In some embodiments, in single-loop decoding, $R_b$ may not be available if $S_b$ is INTER or non-constrained INTRA. For example, an approximation of $R_b$, $R_e$ may be derived as follows: (1) if $S_b$ is non-constrained INTRA and if a required reference pixel to derive $R_b$, is not available in base layer, $S_b$ may be replaced with its co-located pixel in the enhancement layer if available; and (2) if $S_b$ is INTER, the required base layer reference blocks may be replaced by co-located enhancement layer blocks if available. Hence, in either case, a video coder (e.g., the intra-prediction unit 46 of the video encoder 20 or the intra-prediction unit 74 of the video decoder 30) may approximate the pixel values of the sub-block based on one or more pixel values in the enhancement layer.

In an embodiment, $S_b$ may be approximated as either $$S_b' = R_e \quad (4)$$

Or $$S_b' = R_e + E_b \quad (5)$$

The one better matching $S_1$, may be selected and the mode may be signaled. If $E_b$ is 0, then Equations 4 and 5 are the same and no signaling is required.

Thus, a video coder (e.g., the video encoder 20, the video decoder 30, the intra-prediction unit 46 of the video encoder 20, or the intra-prediction unit 74 of the video decoder 30, as discussed above) approximates the pixel values of the sub-block at least in part by generating a predictor for the sub-block based on the one or more pixel values in the enhancement layer and approximating the pixel values of the sub-block based on the predictor for the sub-block and a prediction residual for the sub-block.

In an embodiment, TEXTURE_BL mode prediction residual for sub-block $S_b$ becomes $$e = O_e - R_e \qquad (6)$$

if Equation 4 is selected or $$e = O_e - R_e - E_b = E_e - E_b \qquad (7)$$

if Equation 5 is selected. Note $E_e = O_e - R_e$ is an enhancement prediction residual if $R_e$ is fully derived from the enhancement layer.

In an embodiment, if $S_b$ is INTER, Equation 6 is equivalent to motion compensation in the enhancement layer and Equation 7 is equivalent to motion compensation with residual prediction in the enhancement layer using base layer motion information.

In an embodiment, if $S_b$ is INTRA, Equation 6 is equivalent to intra prediction in the enhancement layer and Equation 7 is equivalent to intra prediction with residual prediction in the enhancement layer using base layer prediction directions.

In some embodiments, $S_b$, may not be approximated as described above.

For example, $S_b$ may be INTER, but a required enhancement layer reference frame may not be in the reference list. As another example, $S_b$ may be INTRA, but required enhancement layer reference pixels may not be available (e.g., the bottom right sub-block (shaded) in FIG. 11). In these cases, a pixel in $S_b$, can be approximated using a closest pixel from the top or left neighbor enhancement CU or using a fixed DC value if both top and left neighbor CUs are not available.

In some embodiments, TEXTURE_BL mode can happen at the CU level or the PU level. For example, if TEXTURE_BL mode happens at the CU level, the CU may only have one PU which is a TEXTURE_BL CU. If TEXTURE_BL mode happens at the PU level, some PUs of a CU may be INTER or INTRA and some may be TEXTURE_BL.

Thus, the TEXTURE_BL mode based on inferred base layer blocks disclosed herein may be an extension of SVC's Mb_inferred mode. The TEXTURE_BL mode disclosed herein may reduce the problems and/or restrictions discussed above.

Accordingly, a video decoder that uses a single-loop decoding approach may approximate pixel values of a sub-block of an inferred base layer block. The inferred base layer block may be in a base layer of the video data. The sub-block may be located in a non-constrained intra mode block in the base layer or the sub-block may be in an inter mode block in the base layer. The video coder may determine, based at least in part on the approximated pixel values of the sub-block of the inferred base layer block, pixel values of a predicted video block in an enhancement layer of the video data, the predicted video block being co-located with the inferred base layer block. As an example, a video code as described herein may achieve a 0.5% increase in coding efficiency.

Figure 12:
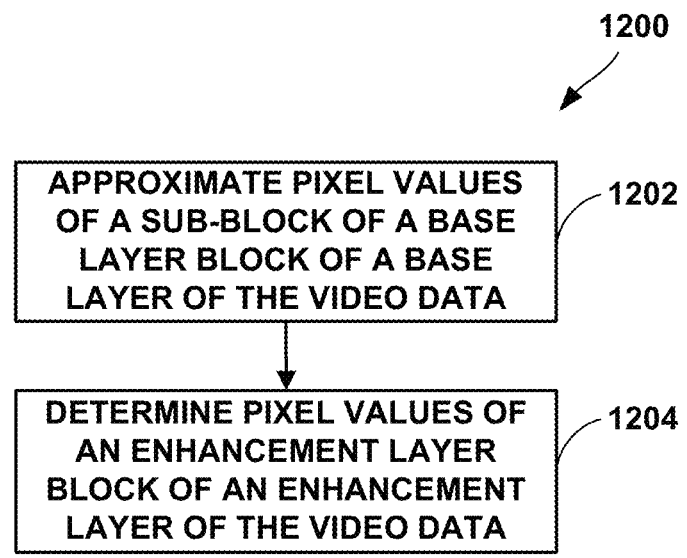
FIG. 12 is a flowchart illustrating an example method for decoding video data using a single-loop decoding approach according to aspects of this disclosure.

FIG. 12 is a flowchart illustrating an example method or process 1200 for decoding video data using a single-loop decoding approach according to aspects of this disclosure. The process 1200 may be performed by a decoder (e.g., the decoder 30 as shown in FIG. 3).

At block 1202, the process 1200 may approximate pixel values of a sub-block of a base layer block of a base layer of the video data. In an embodiment, the approximation may be based on one or more pixel values in an enhancement layer of the video data. In a further embodiment, the base layer may comprise a non-constrained INTRA mode block and/or an INTER mode block. In a further embodiment, the sub-block may be located at least partially within one of the non-constrained INTRA mode block or the INTER mode block.

At block 1204, the process 1200 may determine pixel values of an enhancement layer block of an enhancement layer of the video data. In an embodiment, the determination may be based at least in part on the approximated pixel values of the sub-block. In a further embodiment, the enhancement layer block may be located at a position in the enhancement layer corresponding to a position of the base layer block in the base layer.

In some embodiments, a device may include means for approximating pixel values of a sub-block of a base layer block of a base layer of the video data. In an embodiment, the means for approximating pixel values of a sub-block of a base layer block of a base layer of the video data may be configured to perform one or more of the functions discussed above with respect to block 1202. In further embodiments, the device may include means for determining pixel values of an enhancement layer block of an enhancement layer of the video data. In an embodiment, the means for determining pixel values of an enhancement layer block of an enhancement layer of the video data may be configured to perform one or more of the functions discussed above with respect to block 1204. In a further embodiment, the means for approximating pixel values of a sub-block of a base layer block of a base layer of the video data comprises a processor (e.g., a processor in a video decoder). In a further embodiment, the means for determining pixel values of an enhancement layer block of an enhancement layer of the video data comprises a processor (e.g., a processor in a video decoder).

Figure 13:
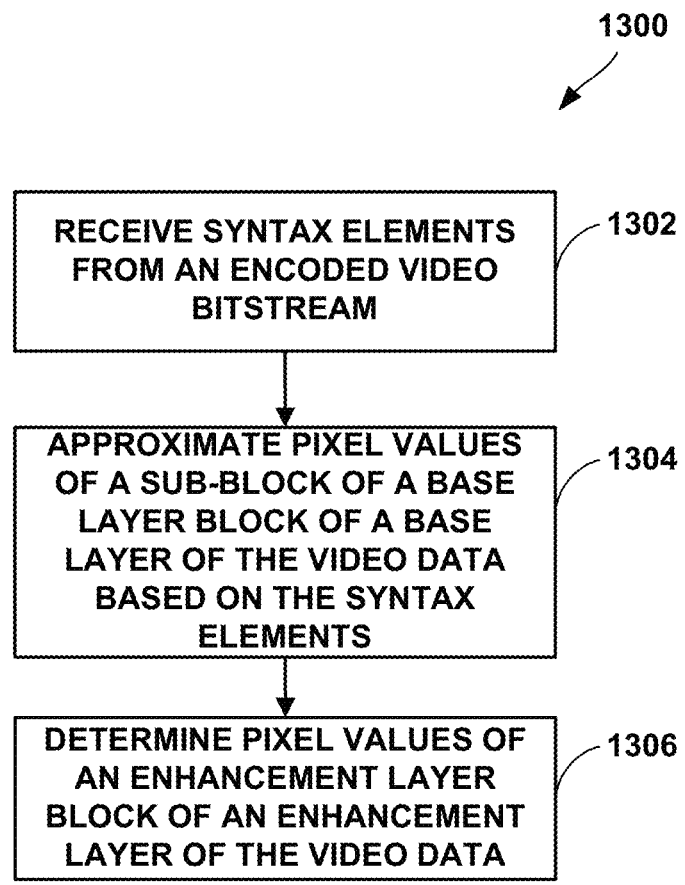
FIG. 13 is a flowchart illustrating an example method for decoding video data using a single-loop decoding approach according to aspects of this disclosure.

FIG. 13 is a flowchart illustrating an example method or process 1300 for decoding video data using a single-loop decoding approach according to aspects of this disclosure. The process 1300 may be performed by a decoder (e.g., the decoder 30 as shown in FIG. 3).

At block 1302, the process 1300 may receive syntax elements extracted from an encoded video bitstream. At block 1304, the process 1300 may approximate pixel values of a sub-block of a base layer block of a base layer of the video data. In an embodiment, the approximation may be based on one or more pixel values in an enhancement layer of the video data. In a further embodiment, the base layer may comprise a non-constrained INTRA mode block and/or an INTER mode block. In a further embodiment, the sub-block may be located at least partially within one of the non-constrained INTRA mode block or the INTER mode block.

At block 1306, the process 1300 may determine pixel values of an enhancement layer block of an enhancement layer of the video data. In an embodiment, the determination may be based at least in part on the approximated pixel values of the sub-block. In a further embodiment, the enhancement layer block may be located at a position in the enhancement layer corresponding to a position of the base layer block in the base layer.

Figure 14:
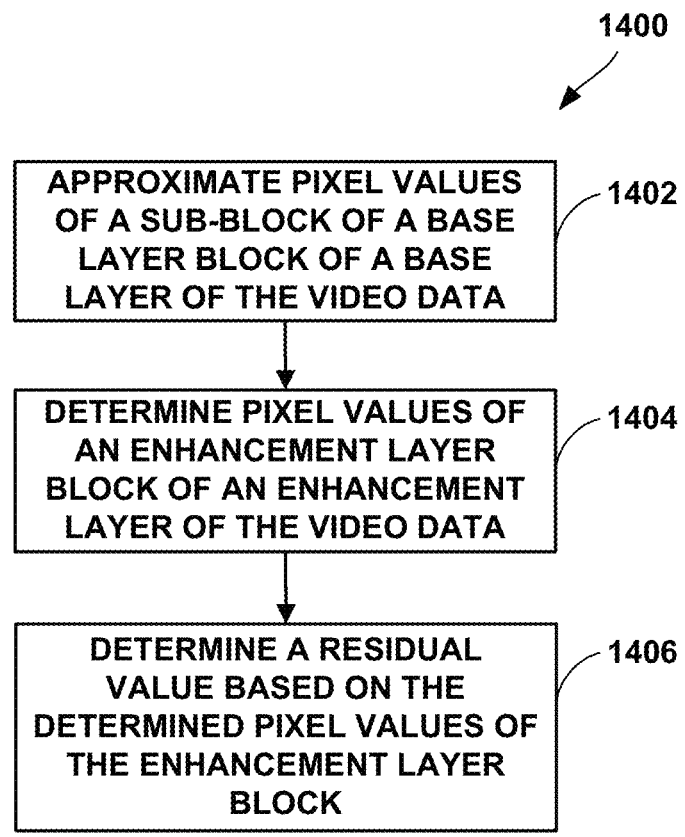
FIG. 14 is a flowchart illustrating an example method for encoding video data using a single-loop decoding approach according to aspects of this disclosure.

FIG. 14 is a flowchart illustrating an example method or process 1400 for encoding video data using a single-loop decoding approach according to aspects of this disclosure. The process 1400 may be performed by an encoder (e.g., the encoder 20 as shown in FIG. 2).

At block 1402, the process 1400 may approximate pixel values of a sub-block of a base layer block of a base layer of the video data. In an embodiment, the approximation may be based on one or more pixel values in an enhancement layer of the video data. In a further embodiment, the base layer may comprise a non-constrained INTRA mode block and/or an INTER mode block. In a further embodiment, the sub-block may be located at least partially within one of the non-constrained INTRA mode block or the INTER mode block.

At block 1404, the process 1400 may determine pixel values of an enhancement layer block of an enhancement layer of the video data. In an embodiment, the determination may be based at least in part on the approximated pixel values of the sub-block. In a further embodiment, the enhancement layer block may be located at a position in the enhancement layer corresponding to a position of the base layer block in the base layer. At block 1406, the process 1400 may determine a residual value based on the determined pixel values of the enhancement layer block.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Various examples have been described. These and other examples are within the scope of the following claims.

What is claimed is:

1. An apparatus configured to code video data using a single-loop decoding approach, the apparatus comprising:
 a memory unit configured to store the video data, wherein the video data comprises a base layer and an enhancement layer, wherein the base layer comprises a base layer block in a first frame, a first block in the first frame, and a second block in the first frame, wherein the first block is predicted based on pixels neighboring the first block, wherein the pixels neighboring the first block are reconstructed based on a third block in a second frame different from the first frame, and wherein the second block is predicted based on a fourth block in a third frame different from the first frame and the second frame; and
 a processor in communication with the memory unit, the processor configured to:
  generate a predictor for the base layer block based on one or more first pixel values in the enhancement layer;
  approximate a reconstruction of the base layer block by approximating pixel values of the base layer block based on the predictor for the base layer block and a prediction residual for the base layer block, wherein the base layer block is located at least partially within a portion of the first block and a portion of the second block; and
  determine, based at least in part on the approximated pixel values of the base layer block, second pixel values of an enhancement layer block in the first frame in the enhancement layer, wherein the enhancement layer block is located at a position in the enhancement layer corresponding to a position of the base layer block in the base layer.

2. The apparatus of claim 1, wherein the base layer block spans multiple prediction units of the base layer.

3. The apparatus of claim 1, wherein the processor is further configured to:
 determine a residual value associated with the enhancement layer block;
 transform the residual value to determine transform coefficients; and
 entropy encode the transform coefficients as an encoded bitstream.

4. The apparatus of claim 1, wherein the processor is further configured to:
 decode transform coefficients for a residual value of the enhancement layer block;
 inverse transform the transform coefficients to determine the residual value; and
 determine a reconstructed block from the residual value and the determined pixel values of the enhancement layer block.

5. The apparatus of claim 1, wherein the first block comprises a non-constrained intra mode block and the second block comprises an inter mode block.

6. A method for decoding video data using a single-loop decoding approach, the method comprising:
 receiving syntax elements extracted from an encoded video bitstream;
 generating a predictor for a base layer block of a base layer of the video data based on one or more first pixel values in an enhancement layer of the video data;
 approximating a reconstruction of the base layer block by approximating pixel values of the base layer block based on the predictor for the base layer block and a prediction residual for the base layer block, wherein the base layer comprises a first block in a first frame and a second block in the first frame, wherein the first block is predicted based on pixels neighboring the first block, wherein the pixels neighboring the first block are reconstructed based on a third block in a second frame different from the first frame, wherein the second block is predicted based on a fourth block in a third frame different from the first frame and the second frame, and wherein the base layer block is located at least partially within a portion of the first block and a portion of the second block; and
 determining, based at least in part on the approximated pixel values of the base layer block, second pixel values of an enhancement layer block of the enhancement layer of the video data, wherein the enhancement layer block is located at a position in the enhancement layer corresponding to a position of the base layer block in the base layer.

7. The method of claim 6, wherein the base layer block spans multiple prediction units of the base layer.

8. The method of claim 6, wherein the first block comprises a non-constrained intra mode block and the second block comprises an inter mode block.

9. The method of claim 6, further comprising determining prediction information for the first block and the second block based on the syntax elements.

10. The method of claim 6, further comprising:
 decoding transform coefficients extracted from the bitstream for a residual value of the enhancement layer block;
 inverse transforming the transform coefficients to determine the residual value; and
 determining a reconstructed block from the residual value and the determined pixel values of the enhancement layer block.

11. A method for encoding video data using a single-loop decoding approach, the method comprising:
 generating a predictor for a base layer block of a base layer of the video data based on one or more first pixel values in an enhancement layer of the video data;
 approximating a reconstruction of the base layer block by approximating pixel values of the base layer block based on the predictor for the base layer block and a prediction residual for the base layer block, wherein the base layer comprises a first block in the first frame and a second block in the first frame, wherein the first block is predicted based on pixels neighboring the first block, wherein the pixels neighboring the first block are reconstructed based on a third block in a second frame different from the first frame, wherein the second block is predicted based on a fourth block in a third frame different from the first frame and the second frame, and wherein the base layer block is located at least partially within a portion of the first block and a portion of the second block;
 determining, based at least in part on the approximated pixel values of the base layer block, second pixel values of an enhancement layer block of the enhancement layer of the video data, wherein the enhancement layer block is located at a position in the enhancement layer corresponding to a position of the base layer block in the base layer; and
 determining a residual value based on the determined pixel values of the enhancement layer block.

12. The method of claim 11, wherein the base layer block spans multiple prediction units of the base layer.

13. The method of claim 11, wherein the first block comprises a non-constrained intra mode block and the second block comprises an inter mode block.

14. The method of claim 11, further comprising:
transforming the residual value to determine transform coefficients; and
entropy encode the transform coefficients as an encoded bitstream.

15. A non-transitory computer readable medium comprising code that, when executed, causes an apparatus to:
generate a predictor for a base layer block of a base layer of the video data based on one or more first pixel values in an enhancement layer of the video data;
approximate a reconstruction of the base layer block by approximating pixel values of the base layer block based on the predictor for the base layer block and a prediction residual for the base layer block, wherein the base layer comprises a first block in a first frame and a second block in the first frame, wherein the first block is predicted based on pixels neighboring the first block, wherein the pixels neighboring the first block are reconstructed based on a third block in a second frame different from the first frame, wherein the second block is predicted based on a fourth block in a third frame different from the first frame and the second frame, and wherein the base layer block is located at least partially within a portion of the first block and a portion of the second block; and
determine, based at least in part on the approximated pixel values of the base layer block, second pixel values of an enhancement layer block of the enhancement layer of the video data, wherein the enhancement layer block is located at a position in the enhancement layer corresponding to a position of the base layer block in the base layer.

16. The medium of claim 15, wherein the base layer block spans multiple prediction units of the base layer.

17. The medium of claim 15, wherein the apparatus is configured to code video data using a single-loop decoding approach.

18. A video decoding device configured to use a single-loop decoding approach to code video data, the video decoding device comprising:
means for generating a predictor for a base layer block of a base layer of the video data based on one or more first pixel values in an enhancement layer of the video data;
means for approximating a reconstruction of the base layer block by approximating pixel values of the base layer block based on the predictor for the base layer block and a prediction residual for the base layer block, wherein the base layer comprises a first block in a first frame and a second block in the first frame, wherein the first block is predicted based on pixels neighboring the first block, wherein the pixels neighboring the first block are reconstructed based a third block in a second frame different from the first frame, wherein the second block is predicted based on a fourth block in a third frame different from the first frame and the second frame, and wherein the base layer block is located at least partially within a portion of the first block and a portion of the second block; and
means for determining, based at least in part on the approximated pixel values of the base layer block, second pixel values of the enhancement layer block of an enhancement layer of the video data, wherein the enhancement layer block is located at a position in the enhancement layer corresponding to a position of the base layer block in the base layer.

19. The video decoding device of claim 18, wherein the base layer block spans multiple prediction units of the base layer.

* * * * *